(12) United States Patent
Herb et al.

(10) Patent No.: US 7,491,260 B2
(45) Date of Patent: Feb. 17, 2009

(54) VALVE OPERATION DIAGNOSTIC METHOD FOR PRESSURE SWING ADSORPTION SYSTEMS

(75) Inventors: Blaine Edward Herb, New Tripoli, PA (US); Charles Franklin Watson, Orange, TX (US); Edward Landis Weist, Jr., Macungie, PA (US); Theodore Michael Sabram, Center Valley, PA (US); Kuo-Kuang Hsu, Macungie, PA (US); Winfried Stephen Hoglen, Lehighton, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 607 days.

(21) Appl. No.: 11/159,530

(22) Filed: Jun. 23, 2005

(65) Prior Publication Data

US 2006/0288867 A1    Dec. 28, 2006

(51) Int. Cl.
*B01D 53/047* (2006.01)
(52) U.S. Cl. .......................................... 95/96; 95/103
(58) Field of Classification Search .............. 95/96, 95/103, 148
See application file for complete search history.

(56) References Cited

U.S. PATENT DOCUMENTS

| 4,234,322 A | 11/1980 | De Meyer et al. |
| 4,299,595 A | 11/1981 | Benkmann et al. |
| 4,605,425 A | 8/1986 | Verrando et al. |
| 6,224,651 B1 | 5/2001 | Monereau et al. |

FOREIGN PATENT DOCUMENTS

| CA | 1193981 | 9/1985 |
| CA | 1193981 A1 | 9/1985 |
| EP | 0086436 A1 | 11/1981 |

*Primary Examiner*—Frank M Lawrence
(74) *Attorney, Agent, or Firm*—Keith D. Gourley

(57) ABSTRACT

Method of operating a pressure swing adsorption system having a plurality of parallel adsorber vessels and a plurality of valves and gas manifolds adapted to introduce gas into each adsorber vessel and withdraw gas from each adsorber vessel in a cyclic series of sequential process steps. A leaking valve may be identified by (1) determining a value of an operating parameter that is a function of the mass of gas provided to a receiving adsorber vessel or withdrawn from an adsorber vessel during a selected process step, portion of a process step, or series of process steps; (2) determining the deviation of the value of the operating parameter from a predetermined reference value; and (3) using the magnitude and direction of the deviation to determine whether any valves are leaking.

21 Claims, 11 Drawing Sheets

| Bed on Repressurization → | A | B | C | D |
|---|---|---|---|---|
| Valve ↓ | | | | |
| 14 or 15 | High | | | |
| 24 or 25 | | High | | |
| 34 or 35 | | | High | |
| 44 or 45 | | | | High |
| 13 | | Low | | |
| 23 | High | | High | High |
| 33 | High | High | Low | High |
| 43 | Low | High | High | Low |
| 11 or 12 | High | | | |
| 21 or 22 | | Low | | |
| 31 or 32 | | | Low | |
| 41 or 42 | | | | Low |

FIG. 4A

Legend:

Low = $G_{pn}$ is below the reference value and the absolute deviation is greater than a defined minimum value High = $G_{pn}$ is above the the reference value and the absolute deviation is greater than the defined minimum value Blank = the absolute deviation of $G_{pn}$ from the reference value is less than the defined minimum value

| Bed on EQ2D - EQ2R → Valve ↓ | A to D | B to A | C to B | D to C |
|---|---|---|---|---|
| 14 | | | | Low |
| 24 | Low | | Low | Low |
| 34 | Low | Low | | |
| 44 | | Low | Low | |
| 13, 11, or 12 | Low | Low | Low | |
| 23, 21, or 22 | | Low | | |
| 33, 31, or 32 | | | Low | Low |
| 43, 41, or 42 | Low | | Low | Low |
| 15 | High | High | | |
| 25 | | High | High | |
| 35 | | | High | High |
| 45 | High | | | High |

FIG. 4B

Legend:

Low = $G_{pn}$ is below the reference value and the absolute deviation is greater than a defined minimum value
High = $G_{pn}$ is above the reference value and the absolute deviation is greater than the defined minimum value
Blank = the absolute deviation of $G_{pn}$ from the reference value is less than the defined minimum value

| Suspected Valve(s) on Bed N | Determination of Test Parameter $G_{pn}$ | | |
|---|---|---|---|
| | Step | Bed | Deviation of $G_{pn}$ |
| Feed and Product Valves (Manifolds 1 and 2, Fig. 1) | Repressurization | N | Low |
| | EQ 2 | N | Low |
| | EQ 2 | N+1 | Low |
| Tail gas Value (Manifold 5, Fig. 1) | Repressurization | N | High |
| | EQ 2 | N | High |
| | EQ 2 | N+1 | High |
| EQ 1 - Repressurization Value (Manifold 3, Fig. 1) | Repressurization | N+1 | Low |
| | Repressurization | N+2 | High |
| | Repressurization | N+3 | High |
| EQ 2 - Provide Purge Value (Manifold 4, Fig. 1) | EQ 2 | N | Low |
| | EQ 2 | N+1 | Low |
| | Repressurization | N | High |
| | EQ 2 | N+2 | High |
| | EQ 2 | N+3 | High |

Legend:

Low = $G_{pn}$ is below the reference value and the absolute deviation is greater than a defined minimum value High = $G_{pn}$ is above the reference value and the absolute deviation is greater than the defined minimum value N represents any bed. For example, if N is Bed A, then N + 1 is Bed B, N + 2 is Bed C, and N + 3 is Bed C.

FIG. 5

VALVE OPERATION DIAGNOSTIC METHOD FOR PRESSURE SWING ADSORPTION SYSTEMS

BACKGROUND OF THE INVENTION

Pressure swing adsorption is a well-known method for the separation of bulk gas mixtures and for the purification of gas streams containing undesirable impurities. The method has been developed and adapted for a wide range of feed gases, operating conditions, product recovery, and product purity. Most large pressure swing adsorption (PSA) systems utilize multiple parallel adsorber beds operated in staggered sequential cycles using typical process steps of feed/adsorption, pressure equalization, depressurization, provide purge, purge, and repressurization. These PSA systems are widely used in the chemical process industries for the recovery and purification of valuable gaseous products such as hydrogen, carbon oxides, synthesis gas, light hydrocarbons, and atmospheric gases.

The design of these PSA systems can present complex operating challenges because of the large number of switching valves required for the cyclic operation of multiple adsorber beds. For example, a relatively simple four-bed PSA system has at least 24 valves while a large ten-bed PSA system may have up to 67 valves. The operation of PSA systems to meet design specifications for product recovery and purity requires that these valves operate reliably of over long periods of time. All valves eventually will experience some type of malfunction, however, and replacement will be necessary. Valve testing and replacement may be carried out during scheduled maintenance outages, but it is likely that some valve malfunctions will occur between scheduled outages.

Valve malfunctions may include, for example, failure of a valve to open or close completely, slow valve response to control signals, no valve response to control signals, and leakage to the atmosphere due to faulty stem seals. These types of malfunctions can be detected relatively easily by skilled plant operators. Another type of valve malfunction is the leakage of gas across a closed valve due to seal degradation. This type of malfunction is much more difficult to detect than the other type of malfunctions because it generally occurs slowly and therefore is not immediately obvious to the plant operators. When the operators finally realize that a valve is leaking, which could take weeks or even months, it is a difficult and time-consuming task to determine which valve is leaking from analysis of available process information. This type of leak can cause a drop in performance of the PSA plant due to unbalanced operation of the adsorbers or due to a direct loss of product gas. In addition, such a leak eventually can progress to a point at which the PSA plant trips off-line, for example, because the concentration of impurities in the product gas exceeds specified limits. This results in unplanned downtime and an economic penalty for the plant owner.

In order to identify the valves that have a sealing defect in the closed position, seal tests are conventionally employed during periodic maintenance shutdowns. However, this type of inspection is time-consuming, laborious, and extends downtime, thereby resulting in lost production. In addition, the time between maintenance shutdowns may be several months to two or more years.

There is a need in the field of PSA gas separation technology for improved operating methods to detect and identify leaking valves while the plant is in operation between regular maintenance shutdowns. This need is addressed by the embodiments of the present invention described below and defined by the claims that follow.

BRIEF SUMMARY OF THE INVENTION

An embodiment of the invention relates to a method of operating a pressure swing adsorption system comprising (a) providing a pressure swing adsorption system having a plurality of parallel adsorber vessels and a plurality of valves and gas manifolds adapted to introduce gas into each adsorber vessel and withdraw gas from each adsorber vessel in a cyclic series of sequential process steps including at least a feed step, a depressurization step, a regeneration step, and a repressurization step;

(b) operating each of the adsorber vessels in the cyclic series of sequential process steps including at least the feed step, the depressurization step, the regeneration step, and the repressurization step, wherein each of the plurality of valves is opened and closed at least once during the cyclic series of sequential process steps in a predetermined valve operating sequence;

(c) determining a value of an operating parameter that is a function of the mass of gas provided to a receiving adsorber vessel or withdrawn from an adsorber vessel during a selected process step, portion of a process step, or series of process steps;

(d) determining the deviation of the value of the operating parameter from a predetermined reference value; and (e) using the magnitude and direction of the deviation of (d) to determine whether any valves are leaking, wherein (1) when the absolute value of the deviation of (d) is less than a predetermined minimum value, no valve is identified as leaking and (2) when the absolute value of the deviation of (d) is greater than the predetermined minimum value, at least one valve is identified as leaking.

The operating parameter may be a gas transfer parameter, $G_p$, defined by the equation $$G_p = f(m_t)$$

where $m_t$ is the mass of gas provided during a time period t to the receiving adsorber vessel during the selected process step, portion of a process step, or series of process steps.

$G_p$ may be equal to (1) the actual mass of gas provided during the time period t to the receiving adsorber vessel during a selected process step, portion of a process step, or series of process steps; (2) the volume of gas provided to the receiving adsorber vessel during the process step, portion of a process step, or series of process steps during the time period t wherein the volume of gas is defined at any standard temperature and pressure; or (3) the decrease in pressure of an adsorber vessel during the time period t that is providing gas to a receiving adsorber vessel during the process step, portion of a process step, or series of process steps.

Alternatively, the operating parameter may be defined as a pressure-normalized gas transfer parameter, $G_{pn}$, by the equation $$G_{pn} = G_p / \Delta P_R$$

where $\Delta P_R$ is the pressure increase in an adsorber vessel receiving gas during the process step, portion of a process step, or series of process steps during time period t and $G_p$ is defined as $$G_p = f(m_t)$$

where $m_t$ is the mass of gas provided to the receiving adsorber vessel during the process step, portion of a process step, or series of process steps during time period t.

In this alternative, $G_p$ may be equal to (1) the actual mass of gas provided during the time period t to the receiving adsorber vessel during a selected process step, portion of a process step, or series of process steps; (2) the volume of gas provided to the receiving adsorber vessel during the process step, portion of a process step, or series of process steps during the time period t wherein the volume of gas is defined at any standard temperature and pressure; or (3) the decrease in pressure of an adsorber vessel during the time period t that is providing gas to a receiving adsorber vessel during the process step, portion of a process step, or series of process steps.

In another alternative, the operating parameter may be defined as a flow-normalized gas transfer parameter, $G_{pf}$, by the equation $$G_{pf} = G_p/G_r$$

wherein $G_p$ is defined as $$G_p = f(m_t)$$

where $m_t$ is the mass of gas provided by an adsorber vessel for transfer to a receiving vessel during the process step, portion of a process step, or series of process steps during time period t and wherein $G_r$ is defined as $$G_r = f(m_{tr})$$

where $m_{tr}$ is the mass of gas flowing into the receiving vessel during the process step, portion of a process step, or series of process steps during time period t.

The selected process step may be the repressurization step. In this case, the operating parameter may be a pressure-normalized gas transfer parameter, $G_{pn}$, defined by the equation $$G_{pn} = G_p/\Delta P_R$$

where $\Delta P_R$ is the pressure increase in the adsorber vessel during time period t that is receiving repressurization gas during the repressurization step or portion of the repressurization step and $G_p$ is equal to the volume of gas provided during time period t to the adsorber vessel during the repressurization step or portion of the repressurization step and wherein the volume of gas is defined at a selected temperature and pressure.

The cyclic series of sequential process steps may include an equalization step in which an adsorber vessel is depressurized by withdrawing a depressurization gas therefrom and introducing the depressurization gas into a receiving adsorber vessel that is increasing in pressure. In this case, the operating parameter may be defined as a pressure-normalized gas transfer parameter, $G_{pn}$, by the equation $$G_{pn} = G_p/\Delta P$$

where $G_p$ is the pressure decrease during time period t in the adsorber vessel providing gas during the equalization step or portion of the equalization step and $\Delta P$ is the pressure increase during time period t in the receiving adsorber vessel receiving gas during the equalization step or portion of the equalization step.

The selected process step may be the blowdown step or the purge step. In these cases, the operating parameter may be a gas transfer parameter, $G_p$, defined by the equation $$G_p = f(m_t)$$

where $m_t$ is a mass of gas discharged from an adsorber vessel during the blowdown step or the purge step.

Another embodiment of the invention relates to a method of operating a pressure swing adsorption system comprising (a) providing a pressure swing adsorption system having a plurality of parallel adsorber vessels and a plurality of valves and gas manifolds adapted to introduce gas into each adsorber vessel and withdraw gas from each adsorber vessel in a cyclic series of sequential process steps including at least a feed step, a depressurization step, a regeneration step, and a repressurization step;

(b) providing a feed gas comprising hydrogen and one or more impurity components;

(c) operating each of the adsorber vessels in the cyclic series of sequential process steps including at least the feed step, the depressurization step, the regeneration step, and the repressurization step, wherein each of the plurality of valves is opened and closed at least once during the cyclic series of sequential process steps in a predetermined valve operating sequence, wherein the feed gas is passed through an adsorber vessel during the feed step to adsorb at least a portion of the one or more impurity components, and wherein a purified hydrogen product gas is withdrawn from the adsorber vessel during the feed step;

(d) determining a value of an operating parameter that is a function of the mass of gas provided to an adsorber vessel during a selected process step, portion of a process step, or series of process steps;

(e) determining the deviation of the value of the operating parameter from a predetermined reference value; and (f) using the magnitude and direction of the deviation of (e) to determine whether any valves are leaking, wherein (1) when the absolute value of the deviation of (e) is less than a predetermined minimum value, no valve is identified as leaking and (2) when the absolute value of the deviation of (d) is greater than the predetermined minimum value, at least one valve is identified as leaking.

The selected process step may be the repressurization step and the repressurization gas may be a portion of the purified hydrogen product gas. In this case, the operating parameter may be a pressure-normalized gas transfer parameter, $G_{pn}$, defined by the equation $$G_{pn} = G_p/\Delta P$$

where $\Delta P$ is the pressure increase in the adsorber vessel receiving the purified hydrogen product gas during the repressurization step or portion of the repressurization step during time period t and $G_p$ is equal to the volume of purified hydrogen product gas provided to the adsorber vessel during the repressurization step or portion of the repressurization step during time period t and wherein the volume of gas is defined at a selected temperature and pressure.

In this embodiment, the cyclic series of sequential process steps may include an equalization step in which an adsorber vessel is depressurized by withdrawing a depressurization gas therefrom and introducing the depressurization gas into another adsorber vessel that is at a lower pressure than adsorber vessel being depressurized. In a more particular case, the cyclic series of sequential process steps may include an equalization step in which an adsorber vessel is depressurized immediately after its feed step by withdrawing a depressurization gas therefrom and introducing the depressurization gas into another adsorber vessel immediately preceding its repressurization step.

BRIEF DESCRIPTION OF SEVERAL VIEWS OF THE DRAWINGS

FIG. 4A is a diagnostic chart for the identification of leaking valves during the Repressurization step using the PSA cycle of FIG. 2.

FIG. 4B is a diagnostic chart for the identification of leaking valves during the Equalization 2 step using the PSA cycle of FIG. 2.

FIG. 5 is a generalized diagnostic chart for the identification of leaking valves during the Equalization 2 and repressurization steps using the PSA cycle of FIG. 2.

DETAILED DESCRIPTION OF THE INVENTION

Figure 1:
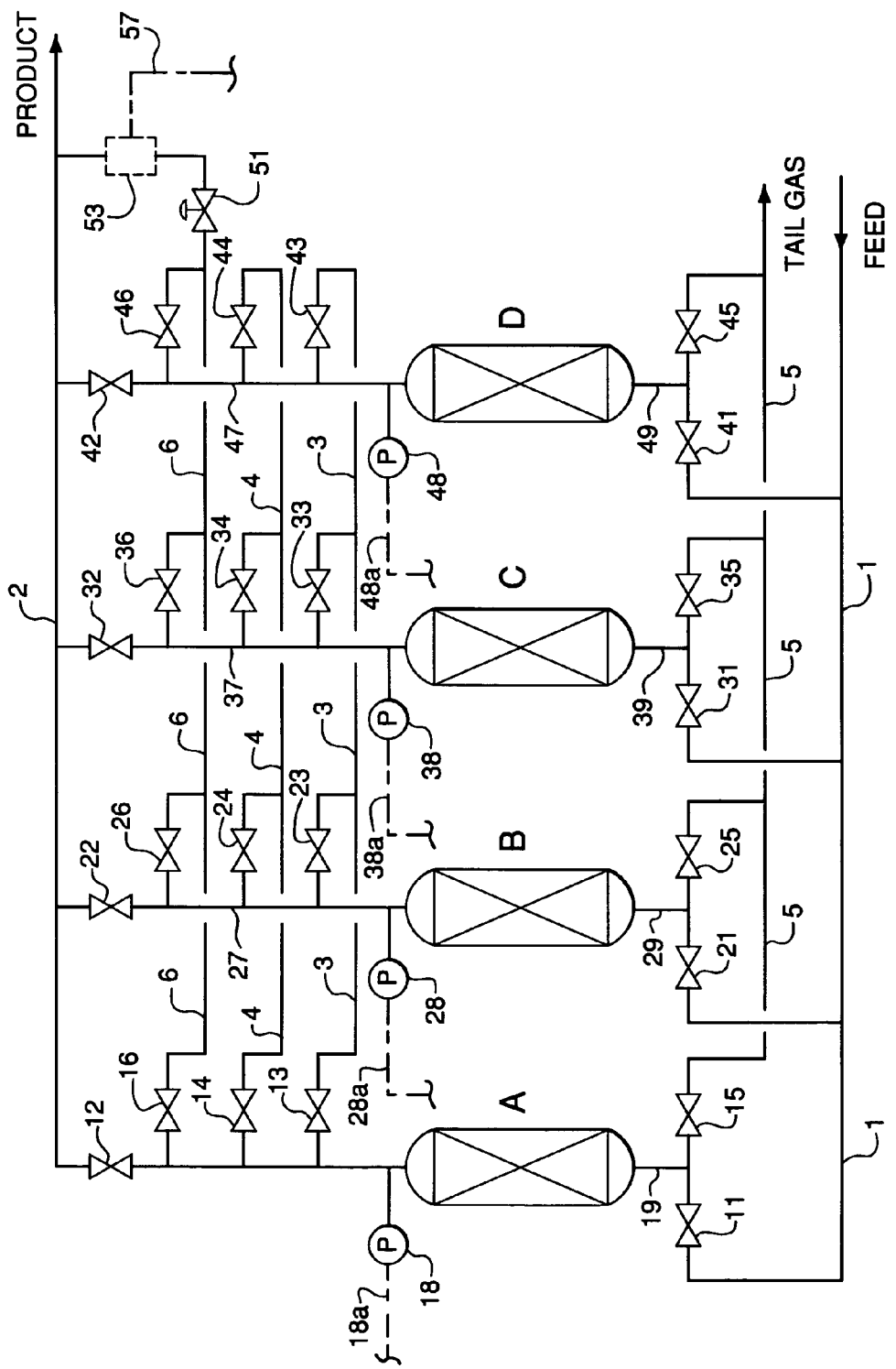
FIG. 1 is a process flow diagram for an exemplary four-bed pressure swing adsorption system.

The embodiments of the present invention provide diagnostic methods to detect and identify leaking valves in operating PSA systems by determining one or more defined operating parameters that are functions of the amount of gas transferred between adsorbers, introduced into an adsorber, or transferred from an adsorber to a receiving vessel during specific process steps and comparing these defined operating parameters with reference values. The determination and comparison may be carried out continuously (i.e., for every cycle) or periodically. In one embodiment, for example, the determination and comparison may be carried out during a daily test period. Deviation of the continuously-determined parameters from the reference values indicates a valve leak, and the interpretation of these parameters over a number of operating cycles identifies a specific valve or a small set of specific valves suspected of leaking.

The embodiments also include methods of characterizing the PSA system operation in order to identify a specific leaking valve or valves. In the present disclosure, a valve leak is defined as an undesirable flow of fluid across a valve which is directed to be closed during a specified period in a PSA cycle. The leak can be caused by any mechanical or operational abnormality in the valve. For example, a valve seal may not perform properly due to wear or improper assembly, thereby causing a leak across the valve. In another example, the mechanical, electrical, or control systems may malfunction such that a valve that should be closed is in fact not completely closed, thereby causing a leak across the valve.

PSA systems utilize multiple parallel adsorber beds operated in staggered sequential cycles using the process steps of feed/adsorption, pressure equalization, depressurization, provide purge, purge, and repressurization. The maximum pressure during a cycle typically is above atmospheric pressure and the minimum pressure during the cycle may be above, equal to, or below atmospheric pressure. The transfer of gas between adsorber beds occurs during pressure equalization, purge/provide purge, and repressurization steps. As will be described in more detail below, a pressure equalization step transfers gas from a bed at decreasing pressure to another bed at increasing pressure, and a provide purge step provides gas from a bed at decreasing pressure to another bed being purged at a relatively constant lower pressure. During a repressurization step, a portion of the product gas from a bed or beds (depending on the number of beds on the feed/adsorption step at any given time) is transferred to a bed at lower pressure that is being repressurized. Parameters that are functions of the amount of gas transferred between adsorbers during certain of these process steps, particularly equalization and repressurization, may be used as described below to determine and identify leaking valves in the system. The blowdown and purge steps also may be used for this determination.

A gas transfer parameter, $G_p$, may be defined as a parameter that is a function of and is derived from the mass of gas transferred during a PSA gas transfer step, portion of a gas transfer step, or series of gas transfer steps wherein gas is transferred to an adsorber bed that is increasing) in pressure from one or more other adsorber beds. The gas transfer parameter is defined as $$G_p = f(m_t)$$

where $m_t$ is the mass of gas provided for transfer during a gas transfer step, portion of a gas transfer step, or series of gas transfer steps during time period t. A gas transfer step is defined as a process step in a PSA cycle during which gas is transferred from an adsorber vessel to another adsorber vessel or to a gas receiving vessel.

The expression $G_p=f(m_t)$ has the usual mathematical meaning wherein the dependent parameter or variable $G_p$ has any mathematical relationship to (i.e., is a function of) the independent variable $m_t$. This relationship, for example, may be linear or non-linear. The term "mass of gas provided for transfer" means a measured, calculated, or inferred mass of gas obtained from one or more adsorber beds for transfer to another adsorber bed or to a gas receiving vessel such as a surge tank. The mass of gas provided for transfer will be the same as the mass of gas received by the receiving bed (or vessel) if there are no leaking valves along the path of gas flow from the providing bed to the receiving bed. If there are leaking valves, the mass of gas provided for transfer will differ from the mass of gas received by the receiving bed.

The value of $G_p$ may be the actual mass of gas defined over time period t by the integrated output of a mass flowmeter or by the output of a totalizing mass flowmeter and may have units, for example, of grams, gram-moles, pounds, or pound-moles. Alternatively, the value of $G_p$ may be the volume of gas provided for transfer during time period t as defined by the integrated output of a volumetric flowmeter or by the output of a totalizing volumetric flowmeter and may have units of, for example, standard cubic feet or standard cubic meters defined at a set of standard conditions. Standard conditions may be defined in the usual manner at any selected combination of pressure and temperature, for example, one atmosphere absolute and 60° F.

In another alternative, the value of $G_p$ may be defined during time period t by the integrated signal output of a flowmeter without conversion to actual mass or volume units and may have units of, for example, millivolt-seconds. In a different alternative, the value of $G_p$ may be defined during time period t by the integrated pressure drop across an orifice plate flowmeter without conversion to actual mass or volume units and may have the units of, for example, psi-seconds or kPa-seconds. In yet another alternative, the value of $G_p$ may be defined by the pressure difference in a vessel providing the transferred gas at decreasing pressure during time period t and may have the units of, for example, psi or kPa. In a further possible alternative, the value of $G_p$ may be determined during time period t by a mass balance (i.e., indirectly by inference or calculation) using measured flow rates and compositions of selected PSA process streams. For example, the amount of gas provided for transfer to a bed undergoing product repressurization may be calculated from the compositions and flow rates of the feed gas and the product gas, and therefore would have the same units used in the mass balance.

Thus $G_p$ may be defined in any measured or calculated units wherein the measurement or calculation is a function of, and is derived from, the mass flow of gas provided for transfer to an adsorber bed during time period t. The value of $G_p$ may depend upon the specific location in the PSA process plant at which the measurement is made and/or may depend upon which process streams are used in the calculation.

A related parameter that may be used in the present method to detect and identify leaking valves in an operating PSA system is the pressure-normalized gas transfer parameter defined as $$G_{pn}=G_p/\Delta P_R=[f(m_t)]/\Delta P_R$$

where $\Delta P_R$ is the pressure increase in an adsorber bed [see below] receiving transfer gas during time period t. The use of the pressure-normalized gas transfer parameter reduces the potential for interference of externally-induced pressure changes in the PSA process with the diagnostic method for identifying leaking valves. Such externally-induced pressure changes may include, for example, changes in the feed pressure, the tail gas discharge pressure, the PSA cycle time, surge drum pressure, changes in the starting pressure of a given step due to a leak during a prior step, changes in cycle time, or changes in plant production rate.

Advantageous PSA process steps for application of the embodiments of the present invention are the product repressurization step and the equalization step or steps following the purge step. The effects of adsorption dynamics on the pressure changes occurring in a bed are generally small for steps that transfer a gas containing a low concentration of impurities to a regenerated adsorbent bed containing a very low loading of adsorbed impurities. The use of these steps for the diagnostic methods described herein may make the analysis and interpretation of the results less complex and more reliable than steps in which adsorption dynamics are significant. In general, the most advantageous PSA process steps for use in these diagnostic methods are steps with the longest durations and steps which cause the largest pressure differentials across closed valves.

In certain operating situations, it may be desirable to use the blowdown step or the purge step for the diagnostic methods described herein. Most PSA systems utilize a surge tank to receive blowdown and waste purge gas and deliver a controlled flow of the waste gas from the surge tank to a downstream user, for example, as fuel gas. In this embodiment, a material balance on the surge tank may be used to calculate the value of the parameter $G_p$ for use in the diagnostic method wherein the amount of gas transferred to the tank from a bed during its blowdown or purge step is determined as the sum of the gas inventory change in the tank during the blowdown or purge step and the integrated flow rate of waste gas withdrawn from the tank during the blowdown or purge step.

Either or both of the parameters $G_p$ and $G_{pn}$ are determined and recorded over multiple cycles of PSA operation with leak-free valves, and reference values of these parameters are obtained during the appropriate process step or steps to characterize leak-free operation. Alternatively, reference values of these parameters may be determined by process simulation using appropriate values of process variables. During each subsequent step or during selected steps over a significant number of PSA cycles, the value of the parameter for that step is monitored and compared with the reference value. A lack of deviation from the reference value indicates a probable absence of leaking valves. It has been found that an observed deviation above a pre-determined minimum value, however, indicates a high probability of a leaking valve somewhere in the system. The monitored values of $G_p$ and $G_{pn}$ used in determined deviations from the reference value should be precise and reproducible As described in detail below, the initial identification of a leaking valve or a group of valves containing a leaking valve will depend on which cycle step is used and the specific location of the gas flow measurements or calculations used to determine the values of the parameters $G_p$ and/or $G_{pn}$.

The embodiments of the present invention may be used with any cyclic PSA system using any number of adsorber beds and any process steps, including PSA cycles with or without idle steps. The embodiments of the present invention may be applied to PSA systems for the separation of any gas mixture and may be used, for example, in (1) the production of high purity hydrogen from a gas mixture containing $H_2$ and one or more impurities from the group consisting of $CO$, $CH_4$, and $CO_2$, (2) the purification of helium containing one or more impurities from the group consisting of $CH_4$, $N_2$, $O_2$, and $Ar$, and (3) the separation of air.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

An exemplary PSA cycle and system for illustrating these embodiments is the well-known four-bed system using a cycle with one adsorber bed on the feed/adsorption step at any given time and with two pressure equalization steps. A schematic process flow diagram for this system is given in FIG. 1. Four adsorber vessels A, B, C, and D each contain a bed of one or more adsorbent materials selective for the adsorption of one or more components in a feed gas mixture. These beds are connected in parallel by six separate manifolds for the introduction of feed gas, the transfer of gas between adsorbers, and the withdrawal of waste gas from the system. Feed gas is introduced via feed gas manifold 1 and product gas is withdrawn via product gas manifold 2. A portion of the product gas is directed into repressurization manifold 6 for final repressurization of each adsorber as described below. Gas transfer manifolds 3 and 4 are used to transfer gas between adsorbers during the provide purge and pressure equalization steps. For example, manifold 3 may be used to transfer gas between adsorbers in a first pressure equalization step and manifold 4 may be used to transfer gas between adsorbers in a second pressure equalization step and in a provide purge step.

Each manifold is connected to the adsorbers by valves to control the flow of gas during the various cycle steps. Feed gas manifold 1 is connected to adsorbers A, B, C, and D by valves 11, 21, 31, and 41 via lines 19, 29, 39, and 49, respectively. Tail gas manifold 5 is connected to adsorbers A, B, C, and D by valves 15, 25, 35, and 45 via lines 19, 29, 39, and 49, respectively. Product gas manifold 2 is connected to adsorbers A, B, C, and D by valves 12, 22, 32, and 42 via lines 17, 27, 37, and 47, respectively. Repressurization gas manifold 6 is connected to adsorbers A, B, C, and D by valves 16, 26, 36, and 46 via lines 17, 27, 37, and 47, respectively. Gas flow to repressurization gas manifold 6 may be controlled by metering valve 51. First pressure equalization gas manifold 4 is connected to adsorbers A, B, C, and D by valves 14, 24, 34, and 44 via lines 17, 27, 37, and 47, respectively. Second pressure equalization gas and provide purge gas manifold 3 is connected to adsorbers A, B, C, and D by valves 13, 23, 33, and 43 via lines 17, 27, 37, and 47, respectively.

The number of manifolds may be modified if desired to simplify the system piping or to utilize different PSA cycles. For example, repressurization manifold 6 and metering valve 51 could be eliminated by making valves 16, 26, 36, and 46 metering valves and connecting them directly into product gas manifold 2. Alternatively, manifold 3 could be eliminated and manifold 6 could be used for both the repressurization and EQ1 steps. In another example, the number of equalization gas manifolds may be increased or decreased if the number of equalization steps is increased or decreased.

Optional flowmeter 53 may be used to measure the flow rate of repressurization gas and send a signal proportional to the flow rate to a central data logging and control system (not shown) via signal line 57. The pressure in each adsorber may be measured by pressure measurement devices 18, 28, 38, and 48 and signals proportional to the pressures may be sent to a central data logging and control system (not shown) via signal lines 18*a*, 28*a*, 38*a*, and 48*a*.

The diagnostic methods described herein may be used to identify leaks in any valve that is not commonly used during all steps in the PSA cycle. For example, valve 51 of FIG. 1 is used commonly used because there is always a bed on the repressurization step. Malfunctions in valve 51, therefore, cannot be identified by these diagnostic methods because this valve is usually open; the method can be used only to detect a leaking valve when it is closed. If a common valve were closed for some step in the cycle, albeit may be possible to detect a leak in that valve during the period when it is closed.

Figure 2:
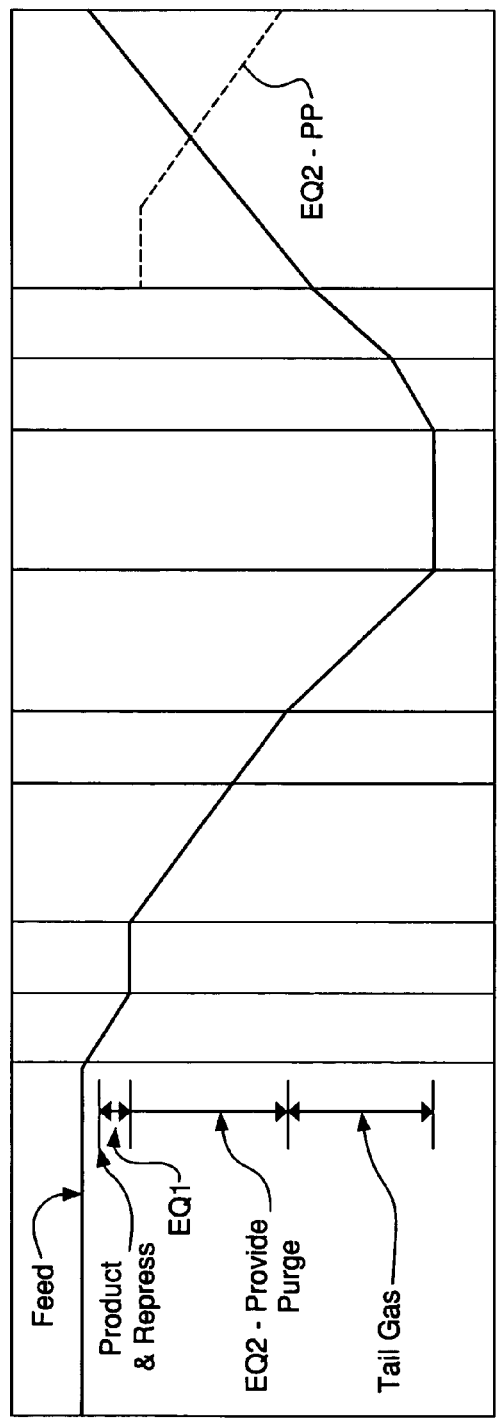
FIG. 2 is a cycle chart and bed pressure profile for a four-bed pressure swing adsorption process having one bed on feed and two pressure equalization steps.

An exemplary PSA process and cycle suitable for use with the system of FIG. 1 and with the embodiments of the present invention is illustrated in FIG. 2. The upper portion of FIG. 2 is a cycle chart for the exemplary process showing the steps for each of the adsorber beds as a function of time and illustrating the time relationship of the steps among the four beds. The ten cycle steps are described below in the order occurring in adsorber bed A:

1. Feed

The feed gas mixture is passed through feed manifold 1, valve 11, and line 19 into and through bed A and one or more components from the feed gas mixture are adsorbed by the adsorbent material therein. Purified product gas, which is not adsorbed in the bed, is withdrawn via line 17, valve 12, and product gas manifold 2. Valves 13, 14, 15, and 16 remain closed during this step. The gas pressure in product manifold 2 is lower than the pressure in feed gas manifold 1 due to the pressure drop in bed A and associated piping.

2. Equalization 1 (Depressurization)

Valves 11 and 12 are closed and valve 13 is opened, and adsorber A is depressurized by withdrawing a first depressurization gas via line 17, valve 13, and manifold 3. This first depressurization gas is introduced via manifold 3, valve 33, and line 37 into bed C in order to increase the pressure therein during its first equalization (repressurization) step. Valves 31, 32, 34, 35, and 36 remain closed during this step. Bed C is defined as a receiving adsorber vessel and bed A is defined as a bed providing gas during the time period t to the receiving adsorber vessel. This step optionally may overlap with the Repressurization step (see step 10 below) wherein bed C also receives product gas for increasing the bed pressure.

3. Idle

Adsorber A is isolated by closing valve 13 and is idle for the period shown. This is an optional step and is required in this particular cycle because of the longer duration of the blowdown step (described below) in bed D relative to the duration of the EQ1 steps in beds A and C.

4. Provide Purge

Valve 14 is opened and bed A is further depressurized by withdrawing gas via line 17, valve 14, and manifold 4. This gas is introduced via valve 44 and line 47 to provide purge gas to bed D that is being purged via valve 45 into tail gas manifold 5.

5. Equalization 2 (Depressurization)

Valve 14 remains open and adsorber A is further depressurized by withdrawing a second depressurization gas via line 17, valve 14, and manifold 4. This second depressurization gas is introduced via manifold 4, valve 44, and line 47 into bed D in order to repressurize bed D during its second equalization (repressurization) step. Valve 45 of bed D is closed during this step. Bed D is defined as a receiving adsorber vessel and bed A is defined as a bed providing gas during the time period t to the receiving adsorber vessel.

6. Blowdown

Valve 14 is closed, valve 15 is opened, and bed A is further depressurized by withdrawing waste gas via line 19, valve 15, and tail gas manifold 5 to a surge tank (not shown). During this step, a portion of the adsorbed impurities is desorbed and withdrawn in the waste gas. Bed A is defined as the bed providing gas during the time period t to this surge tank, which is defined as the receiving vessel.

7. Purge

Bed A is purged by opening valves 14 and 15 to receive purge gas provided from bed B via line 27, valve 24, manifold 4, valve 14, and line 17. During this step, residual adsorbed impurities in bed A are desorbed and removed as purge tail gas via line 19, valve 15, and tail gas manifold 5. The blowdown and purge steps may be defined in combination as a regeneration step.

8. Equalization 2 (Repressurization)

Valve 15 is closed and valve 14 is opened to receive equalization repressurization gas from bed B, which is undergoing its Equalization 2 (Depressurization) step. Bed A is initially repressurized by receiving this gas via line 27, valve 24, manifold 4, valve 14, and line 17. Bed A is defined as a receiving adsorber vessel and bed B is defined as a bed providing gas during the time period t to the receiving adsorber vessel.

9. Equalization 1 (Repressurization)

Valve 14 is closed and valve 13 is opened to receive equalization repressurization gas from bed C, which is undergoing its Equalization 1 (Depressurization) step. Bed A is further repressurized by receiving this gas via line 37, valve 33, manifold 3, valve 13, and line 17. Optionally, bed A also can receive repressurization product gas simultaneously from manifold 6 via valve 16 during a period of overlap with the repressurization step described below. Bed A is defined as a receiving adsorber vessel and bed B is defined as a bed providing gas during the time period t to the receiving adsorber vessel.

10. Repressurization

Valve 13 is closed, valve 16 is opened (or remains open if it was optionally open in step 9), and bed A receives final repressurization product gas from repressurization manifold 6 via valve 16. During this step, bed D provides product gas to manifold 2, a portion of which is withdrawn via manifold 6 as repressurization gas. Bed A is defined as a receiving adsorber vessel and bed D is defined as a bed providing gas during the time period t to the receiving adsorber vessel.

Steps 2, 5, 8, and 9 are described here as pressure equalization steps, although the pressures in the two beds that are exchanging gas may not actually be equal at the end of the step. The duration of the entire cycle of steps 1 through 10 may be in the range of 10 to 15 minutes. In the exemplary cycle chart of FIG. 2, the duration of the steps are shown in approximate proportion for illustration. The duration of the feed step is one quarter of the total cycle duration, the durations of the equalization and idle steps are about one fifth of the duration of the feed step, the durations of the purge, provide purge, and blowdown steps are about two fifths of the duration of the feed step, and the duration of the repressurization step is about four fifths of the duration of the feed step. The durations of the steps (other than the feed step) relative to the total cycle time may be adjusted as desired. The pressure of the feed step may be in the range of 20 to 30 bar gauge (barg). The minimum pressure, i.e., the blowdown pressure, may be in the range of 0 to 1 barg. The pressure of the Equalization 1 step is below the feed pressure and may be in the range of 15 to 25 barg. The pressure of the Equalization 2 step is below the feed pressure and may be in the range of 5 to 10 barg.

Beds B, C, and D proceed through identical steps described above for bed A, but the cycle in each bed is staggered by ¼ of the cycle (i.e., the duration of the feed or adsorption step) as seen in FIG. 2. The cycle chart of FIG. 2 illustrates clearly how the steps in bed A are related to the steps of beds B, C, and D. These relationships are described below with reference to the ¼ cycle that occurs during the feed step of bed A (i.e., step 1), wherein the ¼ cycle is divided into periods with durations a, b, c, and d.

Period a

Bed A: During period a, valve 11 is open and bed A is in a first cocurrent feed/adsorption step, in which the feed gas mixture is introduced via feed manifold 1, valve 11, and line 19 into the inlet of bed A at the feed pressure. The feed gas flows cocurrently through the bed (i.e., from the bed inlet to the bed outlet). Valve 12 is open and the purified product gas is withdrawn to product manifold 2.

Beds B and D: During period a, bed D undergoes its first Equalization 1 (Depressurization) step wherein it is cocurrently depressurized by transferring gas to the outlet of bed B, which is on its Equalization 1 (Repressurization) step. Bed B is countercurrently repressurized by the gas transferred from bed D. Optionally, repressurization product gas via flow control valve 51 and manifold 6 also is introduced into Bed B. During period a, valves 23 and 43 are open and optionally valve 26 is open. During this period, the pressure of bed D falls to an intermediate value that may be defined as the balancing pressure. Similarly, the pressure of bed B rises to this intermediate value if sufficient time is allowed for full pressure equalization. Alternatively, partial equalization may be used in which the step is terminated before the pressures in each bed become equal.

Bed C: During period a, bed C undergoes a first portion of its countercurrent blowdown step in which the bed is depressurized by discharging waste gas through open valve 35 into tail gas manifold 5.

Period b

Bed A: During period b, bed A continues on its feed step following period a.

Bed B: During period b, bed B receives (or continues to receive) product repressurization gas in countercurrent flow via valve 26 and line 27 from repressurization manifold 6 and flow control valve 51.

Bed D: Following the Equalization 1 (Depressurization) step of period a, bed D is isolated by closing and keeping closed valves 41 through 46. This is an optional step and is required in this particular cycle because of the longer duration of the blowdown step in bed C relative to the duration of the Equalization 1 steps in beds A and C. During this idle step, the pressure in bed D optionally may be measured and recorded if desired. If valves 41 through 46 are leak tight in the closed state, the pressure in bed D will stabilize and remain constant.

Bed C: During period b, bed C continues its blowdown step while discharging waste gas through open valve 35 into tail gas manifold 5, and the bed reaches the lowest pressure in the cycle at the end of this step.

Period c

Bed A: During period c, bed A continues on its feed step following periods a and b.

Bed B: During period c, bed B continues on its Repressurization step that commenced during period b.

Bed C: During period c, bed C is purged of impurities at the lowest cycle pressure in a countercurrent direction with gas provided by bed D, which is decreasing in pressure during its Provide Purge step. Valves 34, 35, and 44 are open to introduce purge gas into bed C and to discharge purge tail gas from bed C into tail gas manifold 5.

Bed D: During period c, bed D is in its Provide Purge step and is depressurized cocurrently via valve 44 to supply purge gas to bed C via manifold 4.

Period d

Bed A: During period d, bed A continues on its feed step following periods a, b, and c.

Bed B: During period d, bed B continues with its Repressurization step that commenced during period b.

Beds C and D: During period d, bed C is repressurized by gas that is supplied from bed D that is depressurizing. During repressurization, impurities in bed C are pushed in a countercurrent direction toward the inlet end of the bed. Valves 34 and 44 are open and gas flows via manifold 4.

The lower portion of FIG. 2 shows a typical profile of the pressure in bed A through the cycle described above. This pressure profile may be used to characterize the pressures or pressure ranges of the gas in each of the six manifolds of FIG. 1, which is useful information in diagnosing valve leaks as described below. The highest pressure is in feed gas manifold 1 as shown. The pressure in product gas manifold 2 is lower than that of the feed gas manifold, differing approximately by the pressure drop in each adsorbent bed and the associated piping. The pressure in repressurization manifold 6 is close to that of product manifold 2 or a bed on the Repressurization step, but may be slightly lower due to the pressure drop across valve 51 (if used). Depending on the pressure drops across the valves and piping, the pressure range (identified as EQ1 in FIG. 2) in gas transfer manifold 3 may be below that in repressurization manifold 6, the pressure range (identified as EQ2—Provide Purge in FIG. 2) in gas transfer manifold 4 may be below that in gas transfer manifold 3, and the pressure range in tail gas manifold 5 may be lower than that in gas transfer manifold 4. The pressure in tail gas manifold 5 is determined by the pressure in a downstream surge tank (not shown) and the pressure drop across the tailgas valve and manifold piping. The pressures in gas transfer manifolds 3 and 4 will vary during the cycle steps as the equalization steps proceed, while the pressures in manifolds 1 (feed), 2 (product), 5 (tail gas), and 6 (repressurization) will have minimal variability.

The determination of values of the parameters $G_p$ and $G_{pn}$ may be illustrated with reference to the exemplary flow diagram of FIG. 1 and the exemplary cycle chart of FIG. 2. In one embodiment, the gas transfer parameter, $G_p$, may be determined during a time period t that corresponds to the duration of repressurization step 10 in bed A. In this embodiment, the mass or volume of gas transferred from repressurization manifold 6 into bed A is measured by flowmeter 53 and may be in the units of weight or volume per unit time if the flowmeter has provisions for converting the actual instrument measurement (for example, pressure drop) to these units for transmission by signal line 57 to the central data logging and control system (not shown). Integration of these indicated flow rates over the time period of the repressurization step will give the actual value of the gas transfer parameter $G_p$. Integration may be carried out by the central data logging and control system or by flowmeter 53 if equipped with flow totalizing capability. Alternatively, if the signal from flowmeter 53 transmitted via signal line 57 is an electrical signal (e.g., millivolts) proportional to the mass flow through the flowmeter, this signal may be integrated over the time period of the repressurization step to give an alternative value of the gas transfer parameter $G_p$.

The pressure increase in bed A during the repressurization step is measured by pressure measurement device 18, which may be, for example, a pressure transducer. This pressure difference, $\Delta P_R$, may be characterized in actual pressure units if pressure measurement device 18 converts actual measurements (e.g., an electrical signal in millivolts) to pressure units or alternatively may be characterized in the actual measured units (e.g., millivolts). Alternatively, the signal output of device 18 may be converted into pressure units by the central data logging and control system. The determined value of $\Delta P$ then is used with the determined value of $G_p$ to calculate the pressure-normalized gas transfer parameter, $G_{pn}$, for the repressurization step. The values of $G_p$ and $G_{pn}$ may have various units as described earlier, and these units will depend on the units of the flow and pressure measurements.

If the repressurization step initially overlaps with the Equalization 1 (Repressurization) step as described above, the values of $G_p$ and $G_{pn}$ are determined only for that portion of the repressurization step following the overlap period.

Alternatively, the parameters $G_p$ and $G_{pn}$ may be determined for bed A during step 9, the Equalization 1 (Repressurization) step. In this step, pressurization gas is transferred from bed C to bed A via manifold 3. During this step, the amount of gas provided by bed C may be characterized by the pressure change in that bed during the step as determined by pressure measurement device 38, which may be, for example, a pressure transducer. This pressure difference, $\Delta P_D$, may be characterized in actual pressure units if pressure measurement device 38 converts actual measurements (e.g., an electrical signal in millivolts) to pressure units or may be characterized in the actual measured units (e.g., millivolts). Alternatively, the signal output of device 38 may be converted into pressure units by the central data logging and control system. The determined value of $\Delta P_D$ then is the value of $G_p$ and characterizes the amount of gas provided by bed C during this step. If product repressurization gas also is introduced into bed A from manifold 6 via valve 16, the amount of this gas can be characterized by integrating the flow measured by flowmeter 53 during this step. The value of $G_p$ then is the sum of the gas provided from bed C and from product gas repressurization manifold 6 using the same characteristic units.

The pressure increase in bed A during its Equalization 1 (Repressurization) step is measured as described above by pressure measurement device 18, which may be, for example, a pressure transducer. This pressure difference, $\Delta P_R$, may be characterized in actual pressure units if pressure measurement device 18 converts actual measurements (e.g., an electrical signal in millivolts) to pressure units or may be characterized in the actual measured units (e.g., millivolts). Alternatively, the signal output of device 18 may be converted into pressure units by the central data logging and control system. The determined value of $\Delta P_R$ then is used with the determined value of $G_p$, i.e., $\Delta P_D$, to calculate the pressure-normalized gas transfer parameter as $$G_{pn} = \Delta P_D / \Delta P_R$$

for the Equalization 1 (Repressurization) step of bed A.

Alternatively, the parameters $G_p$ and $G_{pn}$ may be determined for bed A during step 8, the Equalization 2 (Repressurization) step. In this step, pressurization gas is transferred from bed C to bed b via manifold 3. The parameters may be determined by a method analogous to that described above for the EQ1 step.

Once the methods of determining $G_p$ and $G_{pn}$ are selected and the units to be used are defined, a baseline operation of the PSA system of FIG. 1 may be initiated. First, the leak-free status of all valves in the system is confirmed, for example, by leak testing the valves during a maintenance shutdown. The system then is started up and operated according FIG. 2 for a number of repeated cycles to determine leak-free reference values of $G_p$ and/or $G_{pn}$ for each bed for the selected cycle step(s). As mentioned earlier, use of the pressure-normalized gas transfer parameter $G_{pn}$ is advantageous because it reduces the potential for interference of externally-induced pressure changes in the PSA process with the diagnostic method for identifying leaking valves. Such externally-induced pressure changes may include, for example, changes in the feed pressure, changes in the tail gas discharge pressure, sluggish or improper valve operation or control causing incomplete and inconsistent degrees of pressure equalization, and leaks into a bed during a prior step.

Once the reference values of $G_p$ and/or $G_{pn}$ are determined for each bed for the selected cycle step, the values are stored in the central data logging and control system. In each succeeding cycle, the values of $G_p$ and/or $G_{pn}$ are determined and compared with the reference values. If there are no deviations from the reference values, or if the absolute values of the deviations are within a predetermined range, no leaking valves are identified and it is concluded that there are no leaking valves for which a leak rate can be detected. If the absolute values of the deviations from the reference values are observed to be larger than the predetermined amount, however, it is concluded that there are leaking valves somewhere in the system and leaking valves are identified. A diagnostic determination of the valves that may be leaking is made using the magnitude and direction of the observed deviations. As explained further below, the diagnostic determination depends on (1) the specific location or locations at which the flow measurements are made to determine the values of $G_p$ and/or $G_{pn}$ and (2) the directions of the deviations, i.e., positive or negative, from the reference values.

The relative pressures in the gas manifolds will affect this diagnostic analysis. The highest pressure is in feed gas manifold 1 as shown in FIG. 2. Depending on the pressure drops across the valves and piping, the pressure in product gas manifold 2 may be lower than that of the feed gas manifold by the pressure drop in each adsorbent bed and the associated valves and piping. The pressure in repressurization manifold 6 should be close to that of product manifold 2, but may be slightly lower due to the pressure drop across valve 51 (if used). The pressure range in gas transfer manifold 3 (identified as EQ1 in FIG. 2) may be below that in repressurization manifold 6, the pressure range in gas transfer manifold 4 (identified as EQ2—Provide Purge in FIG. 2) may be that in gas transfer manifold 3, and the pressure range in tail gas manifold may be lower than that in gas transfer manifold 4 and is generally at the lowest pressure in the cycle. The pressures in gas transfer manifolds 3 and 4 will vary during the cycle steps as the equalization steps proceed, while the pressures in manifolds 1 (feed), 2 (product), 5 (tail gas), and 6 (repressurization) generally have minimal variability. The pressure in manifold 4 (EQ2—Provide Purge) never exceeds the pressures in manifold 3 (EQ1) or manifold 6 (Repressurization). These relative pressures may be determined or confirmed by pressure measurements on an actual operating system.

When bed A is on the Repressurization step, measuring the gas flow rate at the location of flowmeter 53 (FIG. 1) will allow diagnosis of possible leaks across closed valves 26, 36, and 46 connected to repressurization manifold 6 and of possible leaks across closed valves 11, 12, 13, 14, and 15 associated with bed A. By way of analogy, when bed B is on the Repressurization step, measuring the gas flow rate at the location of flowmeter 53 (FIG. 1) will allow diagnosis of possible leaks across closed valves 16, 36, and 46 connected to repressurization manifold 6 and of possible leaks across closed valves 21, 22, 23, 24, and 25 associated with bed B. By way of further analogy, when bed C is on the Repressurization step, measuring the gas flow rate at the location of flowmeter 53 (FIG. 1) will allow diagnosis of possible leaks across closed valves 16, 26, and 46 connected to repressurization manifold 6 and of possible leaks across closed valves 31, 32, 33, 34, and 35 associated with bed C. Finally, by way of further analogy, when bed D is on the Repressurization step, measuring the gas flow rate at the location of flowmeter 53 (FIG. 1) will allow diagnosis of possible leaks across closed valves 16, 26, and 36 connected to repressurization manifold 6 and of possible leaks across closed valves 41, 42, 43, 44, and 45 associated with bed D.

Figure 3:
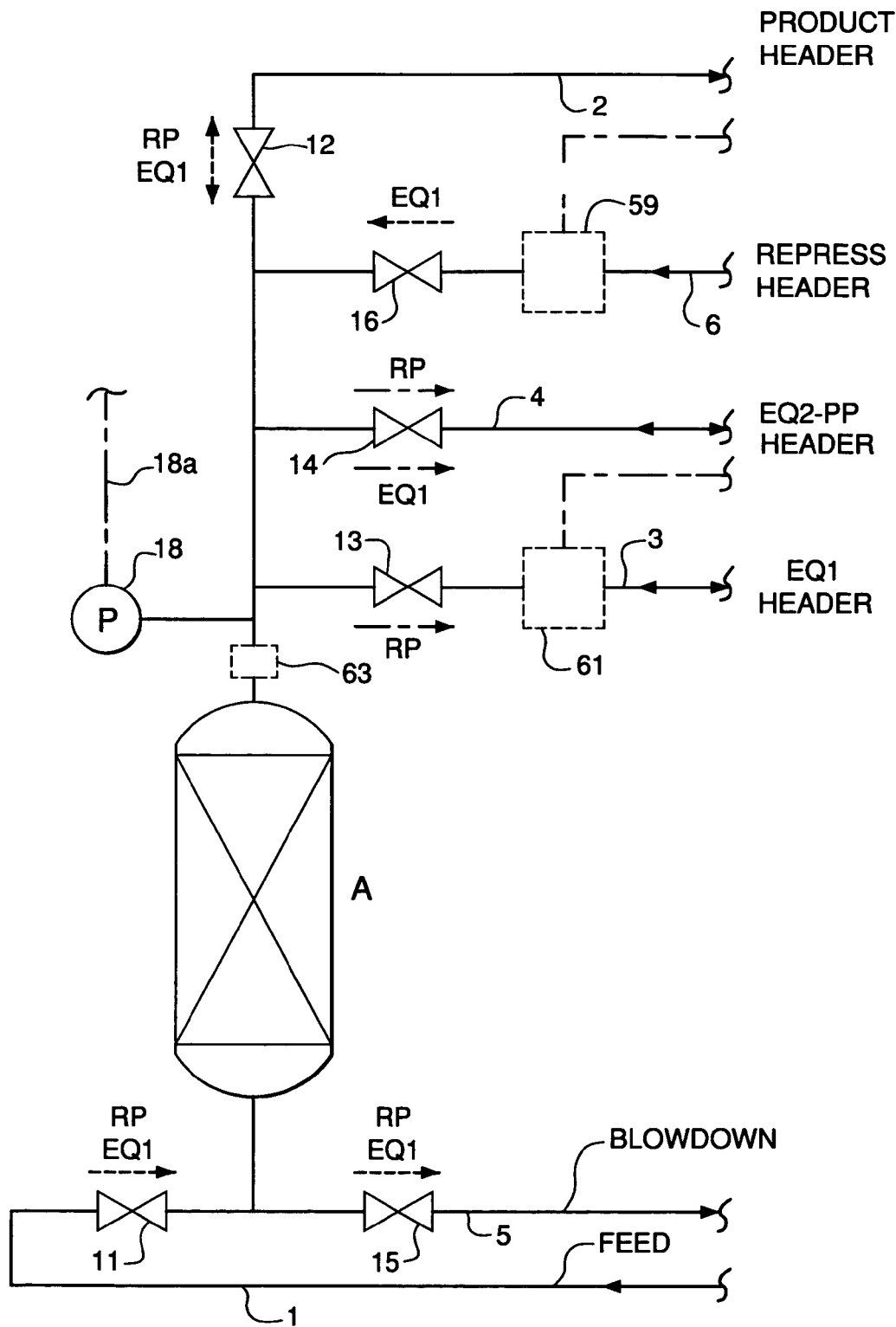
FIG. 3 is an enlarged portion of FIG. 1 showing one of the beds.

A more detailed illustration of bed A is shown in FIG. 3, which is an enlarged portion of FIG. 1. When bed A is on its Repressurization step, for example, a leak across valve 11 will be in the direction shown, i.e., into bed A, thereby increasing the pressure in Bed A. A leak across valve 15 will be in the direction shown, i.e., out of bed A, thereby decreasing the pressure in Bed A. A leak across valve 13 will be in the direction shown, i.e., out of bed A, thereby decreasing the pressure in Bed A. A leak across valve 12 will be in the direction shown, i.e., into bed A, thereby increasing the pressure in Bed A. A leak across valve 14 will be in the direction as shown, i.e., out of bed A. The pressures in these manifolds may be measured to confirm in which direction the valves would leak. This could be a way to refine the diagnostic charts described below. The manifold pressure may be measured directly or may be estimated from pressure drop analysis based on the pressures of the two beds that are equalizing. This is shown in the lower portion of FIG. 2, which superimposes the pressure profile in equalization manifold 4 on the pressure profile in bed A during its Repressurization step.

Analogous observations can be made for each of beds B, C, and D when each bed is on the Repressurization step and the Equalization 1 (Repressurization) step. These observations for Beds A, B, C, and D then can be used in connection with the monitored values of the gas transfer parameters $G_p$ and $G_{pn}$ to develop valve diagnostic tables for identifying a leaking closed valve or a group of closed valves (suspected of leaking) in which one valve is leaking as described below.

In this analysis method, it is assumed that only one valve is leaking in order to develop the diagnostic tables. It may be possible to develop diagnostic tables that apply if two valves leak at one time; however, they would be more complex and more difficult to interpret. The objective in the present method is to correct individual valve leaks when they first occur and therefore avoid a situation with multiple valve leaks.

As an alternative to or in addition to measuring repressurization flow by flowmeter 53 (FIG. 1), a flowmeter may be installed at each bed, for example, flowmeter 59 on bed A as shown in FIG. 3. In this alternative, valves 26, 36, and 46 of repressurization manifold 6 need not be considered in the valve diagnosis exercise when bed A is on its Repressurization step and the analysis can concentrate on valves 11, 12, 13, 14 and 15. Analogously, the alternative of measuring flow at the bed repressurization inlet has benefits for valve diagnosis of the valves on beds B, C, and D, because the corresponding valves on repressurization manifold 6 need not be considered. Measuring flow at all locations, i.e., by flowmeter 53, by flowmeter 59 at bed A, and by analogous flowmeters at the other three beds, will generate significant additional information for further use in developing an accurate diagnosis of valves connected to repressurization manifold 6 and the other valves connected to the beds.

The above analysis of the beds on the Repressurization step may be extended to the Equalization 1 (Repressurization) step. When bed A is on its Equalization 1 (Repressurization) step, a leak across valve 11 will be in the direction shown in FIG. 3, i.e., into bed A, thereby increasing the pressure in Bed A. A leak across valve 15 will be in the direction shown, i.e., out of bed A, thereby decreasing the pressure in Bed A. A leak across valve 12 will be in the direction shown, i.e., into bed A, thereby increasing the pressure in Bed A. A leak across valve 14 will be in the direction shown, i.e., out of bed A, thereby decreasing the pressure bed A. A leak across valve 16 will be in the direction shown, i.e., into bed A, thereby increasing the pressure in Bed A.

As an alternative to or in addition to calculating equalization flow to bed A from bed C by measuring the pressure difference in bed C, a flowmeter may be installed at each bed, for example, flowmeter 61 on bed A as shown in FIG. 3. In this alternative, valves 24, 34, and 44 of equalization manifold 4 need not be considered in the valve diagnosis exercise when bed A is on its Equalization 1 (Repressurization) step, and the analysis can concentrate on valves 11, 12, 13, 15, and 16. Analogously, the alternative of measuring flow at the bed equalization gas inlet has benefits for valve diagnosis of the valves on beds B, C, and D, because the corresponding valves on equalization manifold 4 need not be considered. Measuring or determining flow at all locations, i.e., by flowmeter 61 at bed A, by analogous flowmeters at the other three beds, and by pressure difference in the beds providing Equalization 1 gas, will generate significant information for accurate diagnosis of valves connected to equalization manifold 4 and the other valves connected to the beds.

Determination of the gas transfer parameters $G_p$ and $G_{pn}$ for use in the diagnostic method for the Repressurization step of bed A may be illustrated with reference to FIGS. 1 and 3. $G_p$ may be determined for the Repressurization step by totalizing the gas flow measured by flowmeter 53 (FIG. 1) during the step. The pressure increase in bed A during the Repressurization step, i.e., $\Delta P_R$, is determined by pressure measurement device 18. $G_{pn}$ then is calculated by dividing $G_p$ by $\Delta P_R$. Alternatively, $G_p$ may be determined for the Repressurization step by totalizing the gas flow measured by flowmeter 59 (FIG. 3) during the step and $G_{pn}$ then may be calculated from this value.

Determination of the gas transfer parameters $G_p$ and $G_{pn}$ for use in the diagnostic method for the Equalization 1 (Repressurization) step of bed A also may be illustrated with reference to FIGS. 1 and 3. $G_p$ may be determined for the Equalization 1 (Repressurization) step by measuring the decrease in pressure in bed C by pressure measurement device 38 while bed C is providing equalization gas to bed A, i.e., $\Delta P_D$. This is an indication of the amount of gas provided from bed C during that step. The pressure increase in bed A during the Repressurization step, i.e., $\Delta P_R$, is determined by pressure measurement device 18. $G_{pn}$ then is calculated by dividing $\Delta P_D$ by $\Delta P_R$. Alternatively, $G_p$ may be determined for the Equalization 1 (Repressurization) step by totalizing the gas flow measured by flowmeter 61 (FIG. 3) during the step, and then dividing $G_p$ by $\Delta P_R$ to obtain $G_{pn}$.

An alternative method for determining parameters for the leak diagnostic method may be utilized in which gas flow is measured at the outlet end of each adsorber bed as shown by flowmeter 63 in FIG. 3. In this alternative, $G_p$ for a pressure equalization step is determined by integrating the gas flow rate measured at the outlet of the bed providing gas and decreasing in pressure during this step. The flow rate of gas entering the receiving bed that is increasing in pressure may be measured and integrated during this step to give a parameter defined as $G_r=f(m_{tr})$ where $m_{tr}$ is the mass of gas entering a receiving adsorber vessel or surge tank for the blowdown step that is increasing in pressure during the process step. A flow-normalized parameter, $G_{pf}$, may be defined as $G_{pf}=G_p/G_r$. Either or both of the parameters $G_p$ and $G_{pf}$ then may be used in the diagnostic method to identify leaking valves. A similar approach may be used for the repressurization step wherein $G_p$ represents the amount of gas provided for repressurization and is calculated as the difference between (1) the integrated flow rate of gas provided from the bed on the feed step and (2) the integrated flow rate of final product gas leaving product gas manifold 2 (FIG. 1). The flow rate of gas entering the receiving bed (or surge tank) may be measured and integrated during this step to give the parameter $G_r$ as described above. The flow-normalized parameter $G_{pf}$ then may be calculated by dividing $G_p$ by $G_r$.

The gas transfer parameters may be determined for a defined portion of a specific step rather than for the full duration of the step as described above. In other situations, the gas transfer parameters may be determined over the duration of a series of steps, for example, the EQ1 (Repressurization) and Repressurization steps (see steps 9 and 10 of FIG. 2). Whichever step, portion of a step, or series of steps is selected, however, it is important that the same step, portion of a step, or series of steps be used in the repeated determinations of the gas transfer parameters. The selection of the step, portion of a step, or series of steps may depend upon the actual operating characteristics of the plant. It may be desirable to determine and monitor the gas transfer parameters for two or more steps in order to develop a broader-based diagnostic method than would be possible if only one step were used for diagnosis.

When the determined gas transfer parameter is compared with a predetermined reference value, the observed deviation or difference is used to diagnose leaking valves as described above. The magnitude of this difference and the direction of the deviation (i.e., a positive or negative deviation from the reference value) are used to determine which of the valves that are closed or should be closed during the selected process step are possibly leaking. In order to eliminate small process variabilities (typically described as "noise"), the diagnosis may be based on the absolute value of the observed deviation and its magnitude relative to a predetermined minimum value. When the absolute value of the observed deviation is greater than a predetermined minimum value, a decision is made that a valve or one of a group of possible leaking valves is actually leaking, and the leaking valves are identified. This predetermined minimum value is based on operating experience at a particular plant, and will depend upon the operating characteristics of that plant (e.g., pressure and composition variability of the feed gas, changes in the required product purity, the cycle and number of beds, and the like). The predetermined minimum value may be set as a percentage of the reference value, and may be, for example, 5% of the reference value. In some plants, this may range up to 10% of the reference value.

The following Examples illustrate embodiments of the present invention but do not limit the invention to any of the specific details described therein.

EXAMPLE 1

The PSA system of FIG. 1 is operated for the production of high purity hydrogen from a mixture of hydrogen, carbon monoxide, carbon dioxide, and methane produced by the steam reforming of natural gas. In this Example, manifold 6 and the associated valves 16, 26, 36, and 46 were eliminated and manifold 3 was used for both the Repressurization and the EQ1—Repressurization steps. The flow of product gas into the manifold was measured and controlled by flowmeter 53 and flow control valve 51, respectively. The system is operated according to a modification the cycle of FIG. 2 in which the EQ1 and Repressurization steps overlap such that the repressurizing gas is a combination of transfer gas from a depressurizing bed and product gas via valve 51. $G_{pn}$ is determined as described below only during the Repressurization step after the end of the EQ1 step.

The valve positions (open or closed) during the cycle steps and the pressure relationships among the six manifolds and the adsorbent beds were utilized to develop a diagnostic chart for the Repressurization step of each of adsorber beds A, B, C, and D. The diagnostic chart is shown in FIG. 4A.

This chart shows the expected pattern of deviations that would be observed using checks made during the Repressurization steps. For this particular PSA cycle and pressure profile shown in FIG. 2, the deviations as shown are expected if a particular valve is leaking while the bed is on the Repressurization step. If the feed valve on a bed (i.e., valve 11, 21, 31, or 41) is leaking during this step, then the value of the pressure-normalized gas transfer parameter $G_{pn}$ (i.e., the ratio of the amount of repressurization hydrogen provided via manifold 3 to the pressure increase in the bed being repressurized) is expected to deviate below the reference value because a volume of feed gas will leak into the bed and thereby reduce the volume of repressurization hydrogen required to complete this step. If the product valve (i.e., valve 12, 22, 32, or 42) is leaking during this step, then $G_{pn}$ is expected to deviate below the reference value because a volume of product gas will leak into the bed via leaking product valve and thereby reduce the volume of repressurization hydrogen required to complete this step.

If the Equalization 2—Provide Purge valve (i.e., valve 14, 24, 34, or 44) on the bed is leaking during this step, then the value of $G_{pn}$ is expected to deviate above the reference value because a volume of gas will leak out of the bed and into manifold 3 and thereby increase the volume of repressurization hydrogen required to complete this step. During a portion of the Repressurization step of any bed, another bed is on the Idle step and all of the EQ2—PP valves (i.e., valves 14, 24, 34, and 44) are closed, and manifold 4 is isolated from the other beds. However, during the remaining portion of the Repressurization step, manifold 4 is no longer isolated. It is possible to define a Repressurization check only during the portion of the Repressurization step when manifold 4 is not isolated.

If the tail gas valve (i.e., valve 15, 25, 35, or 45) on the bed is leaking during this step, then the value of $G_{pn}$ is expected to deviate above the reference value because a volume of gas will leak out of the bed and thereby increase the volume of repressurization hydrogen required to complete this step. If the EQ1—Repressurization valve (i.e., valve 13, 23, 33, or 43) on a bed is leaking during the Repressurization step, then the value of $G_{pn}$ is expected to deviate below the reference value when bed (i+1) (i.e., the bed that undergoes the Repressurization step immediately after Repressurization of the bed with the leaking EQ1—Repressurization valve) in the cycle is on Repressurization, and the value of $G_{pn}$ is expected to deviate above the reference value when beds (i+2) and (i+3) are on Repressurization. When any bed (i) is on Repressurization, the EQ1—Repressurization valve (i.e., valve 13, 23, 33, or 43) will be open and hence will not exhibit a leak. The leak will be into bed (i+1) when the EQ1—Repressurization valve is leaking because the pressure in bed (i+1) will be higher than the pressure in bed (i) during this step. The leak will be out of bed (i+2) and (i+3) because the pressure in bed (i+2) and (i+3) will be higher than the pressure in bed (i) during the Repressurization steps of beds (i+2) and (i+3), respectively.

FIG. 4A thus shows the expected pattern of deviations that would be obtained when the Repressurization check is made with each bed is on its Repressurization step. From this pattern, it is possible to determine which bed contains the leaking valve and it is possible to narrow the list of possible leaking valves to at most two different valves on the same bed. This example illustrates the utility of this method to detect leaks and quickly determine which valve(s) are most likely to be leaking.

EXAMPLE 2

The PSA system of FIG. 1 is operated according to the system and cycle of Example 1 for the production of high purity hydrogen from a mixture of hydrogen, carbon monoxide, carbon dioxide, and methane produced by the steam reforming of natural gas. The valve positions (open or closed) during the cycle steps and the pressure relationships among the six manifolds and the adsorbent beds were utilized to develop a diagnostic chart for the Equalization 2—Depressurization step of each of adsorber beds A, B, C, and D. The diagnostic chart is shown in FIG. 4B, which shows the expected pattern of deviations that would be revealed using diagnostic checks made during this step. For this particular PSA cycle and pressure profile (see FIG. 2), the following deviations are expected if a particular valve is leaking while a bed (i) is on the EQ2—Depressurization step. For this example, when bed (i) is on the EQ2—Depressurization step, it is providing gas to bed (i−1) which is on its EQ2—Repressurization step. A low deviation of $G_{pn}$ from the reference value means that a given valve, if leaking, is expected to leak gas into the system of the two beds that are exchanging gas during the EQ2 step. A high deviation of $G_{pn}$ from the reference value means that a given valve, if leaking, is expected to leak gas out of the system of the two beds that are exchanging gas during the EQ2 step.

EXAMPLE 3

The diagnostic charts of FIGS. 4A and 4B were combined to yield the generic diagnostic chart of FIG. 5 for the cycle and PSA system of Examples 1 and 2. FIG. 5 may be used to determine the probability of and identify leaking valves on any adsorber bed N. For example, if the tail gas valve on bed A (valve 15, FIG. 1) is leaking, the following deviations would be expected: $G_{pn}$ determined during the repressurization of bed A would be high, $G_{pn}$ determined during the EQ2 step of bed A would be high, and $G_{pn}$ determined during the EQ2 step of bed B would be high. In another example, if the EQ2—provide purge valve on bed A (valve 14, FIG. 1) is leaking, the following deviations would be expected: $G_{pn}$ determined during the repressurization of bed A would be high, $G_{pn}$ determined during the EQ2 step of bed C would be low, and $G_{pn}$ determined during the EQ2 step of bed D would be low.

If all criteria of Table 5 are met for a given valve, it is essentially certain that the valve is leaking. If less than all criteria are met, however, the probability of a leak decreases. For example, if two of the three test criteria for the tail gas valve are met, the probability that the valve would be leaking is 67%. In a specific example, if the deviation of $G_{pn}$ is high for the EQ2 step for bed A, high for the EQ2 step of bed B, but below the minimum deviation for the Repressurization step of bed A, then the probability that the tail gas valve on bed A would be leaking is 67%.

EXAMPLE 4

Tests to illustrate the application of the method described above were performed on an operating hydrogen PSA plant that produced a nominal 7 million standard cubic feet per day of 99.999% purity hydrogen from a nominal refinery offgas feed blend containing 70 to 80 vol % hydrogen, ~15% $CH_4$, ~7% $C_2H_6$, and ~4% $C_3H_8$. The plant was operated with a four bed system and cycle of Examples 1-3 with a total cycle time of approximately 20 min.

The leak-free status of all valves in the PSA system was confirmed initially during a plant outage. The plant then was operated at reference baseline conditions to establish reference profiles of $G_{pn}$ vs. operating clock time for the Equalization 2 (Repressurization—Depressurization) step (step 8, FIG. 2) and the Repressurization step (step 10, FIG. 2). The values of $G_{pn}$ for the EQ2 step were determined as the ratio of the measured pressure change of the bed providing gas to the measured pressure change of the bed receiving gas during the step. In this step, the values of $G_{pn}$ were dimensionless. The values of $G_{pn}$ for the Repressurization step were determined as the ratio of the measured repressurizing gas flow in manifold 6 to the measured pressure change of the bed receiving repressurization gas during the step. In this step, the values of $G_{pn}$ had the units of million standard cubic feet/psi.

During this initial period, changes to certain operating parameters were made to determine the effects of such changes on the reference profiles. These included changes to the adsorption pressure, the PSA cycle time, surge drum pressure, hydrogen production rate, and transition from flow control to pressure control of hydrogen production. For example, at about 9:00 a.m. the PSA cycle time was decreased from 351 sec to 340 sec; between 9:45 and 10:40 a.m. the surge drum pressure was increased from 4 to 4.5 to 5 psig and then returned to 4 psig. At about 11:15 a.m. the hydrogen production rate was lowered from 260 to 220 thousand standard cubic feet per hour.

Figure 6A:
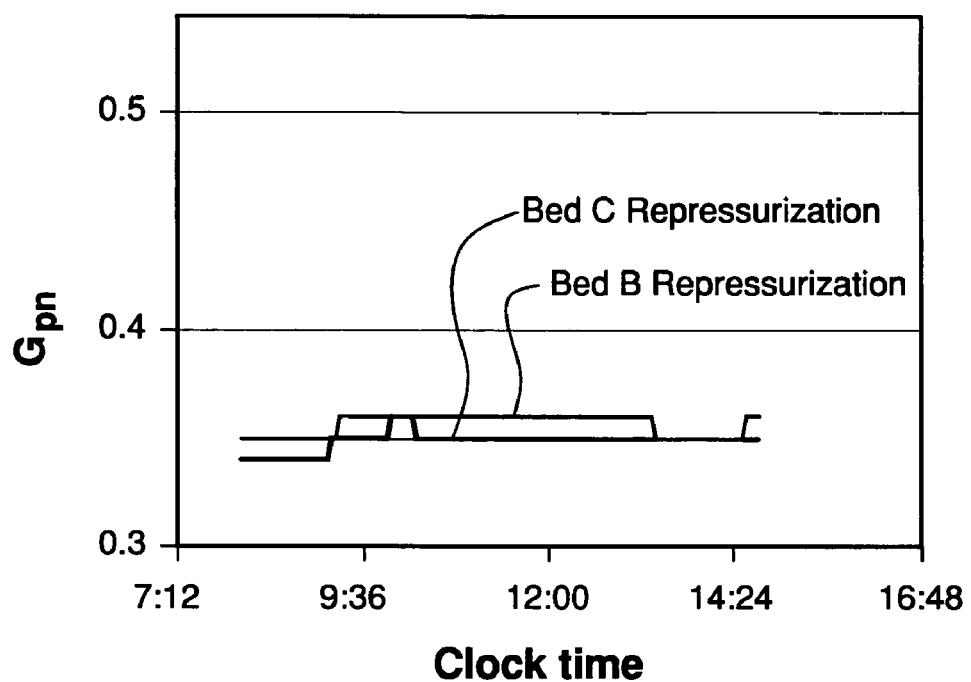
FIG. 6A is a plot of $G_{pn}$ vs. clock time for a reference baseline check of the Repressurization step in a four-bed pressure swing adsorption system having no leaking valves.
Figure 6B:
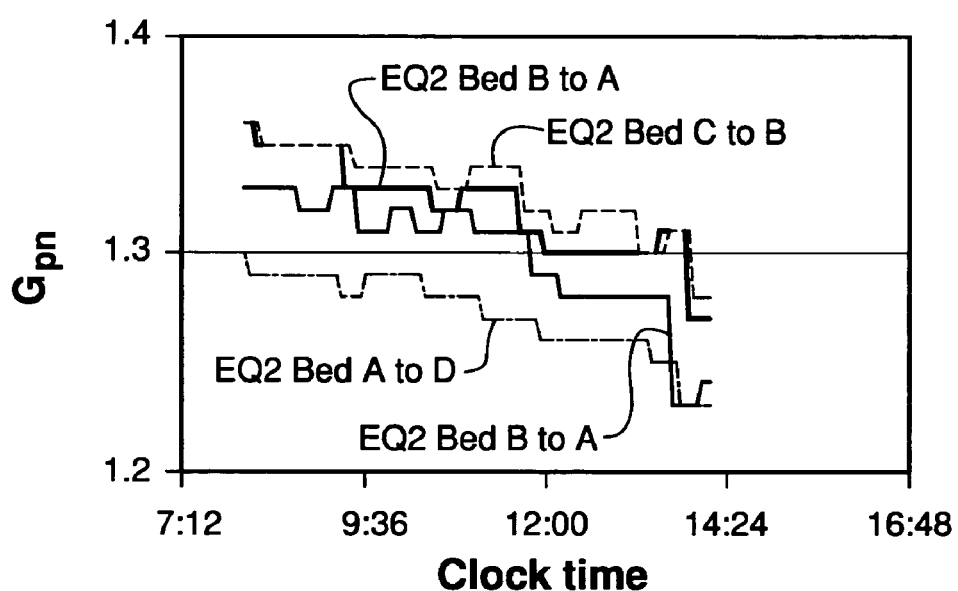
FIG. 6B is a plot of $G_{pn}$ vs. clock time for a reference baseline check of the Equalization 2 (Depressurization—Repressurization) step in a four-bed pressure swing adsorption system having no leaking valves.

The resulting reference profiles are given in FIGS. 6A and 6B. It is seen that the process changes have a slight but insignificant effect on the profiles for the repressurization step, whereas the process changes have a more pronounced effect on the profiles for the EQ2 step. It also was observed that the variability of the profiles among the pairs of equalizing beds was higher than the variability among the beds undergoing repressurization. Since no leaks were occurring, the value recorded for $G_{pn}$ was expected to remain constant as shown for the ratios measured during the Repressurization check. There are several reasons for the increased variability. One reason is that the flow into the bed that receives gas is not accurately measured by the pressure change of the bed providing gas. The amount of gas provided by this bed as defined by a given pressure decrease in the bed will depend on factors such as the initial temperature and pressure of the system as well as the loading of impurities on the bed. These parameters were changing during this testing. Better accuracy could be attained by measuring this flow directly by installing a flowmeters in manifold 4.

EXAMPLE 5

Figure 7A:
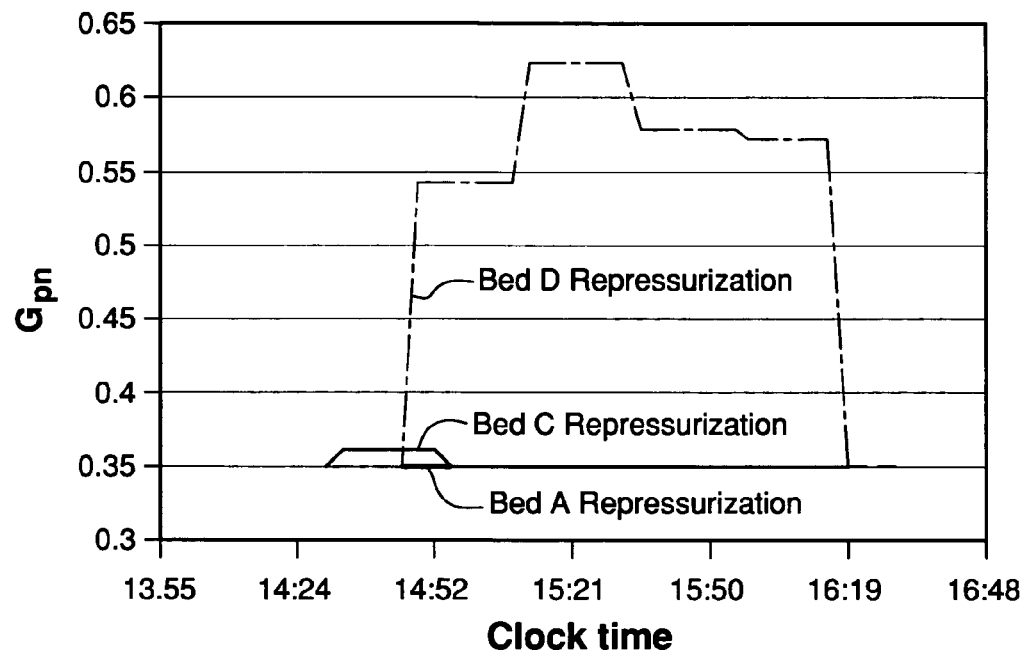
FIG. 7A is a plot of $G_{pn}$ vs. clock time for the Repressurization step in a four-bed pressure swing adsorption system when valve 25 in FIG. 1 (the tailgas valve on bed B) was subjected to a deliberate leak.
Figure 7B:
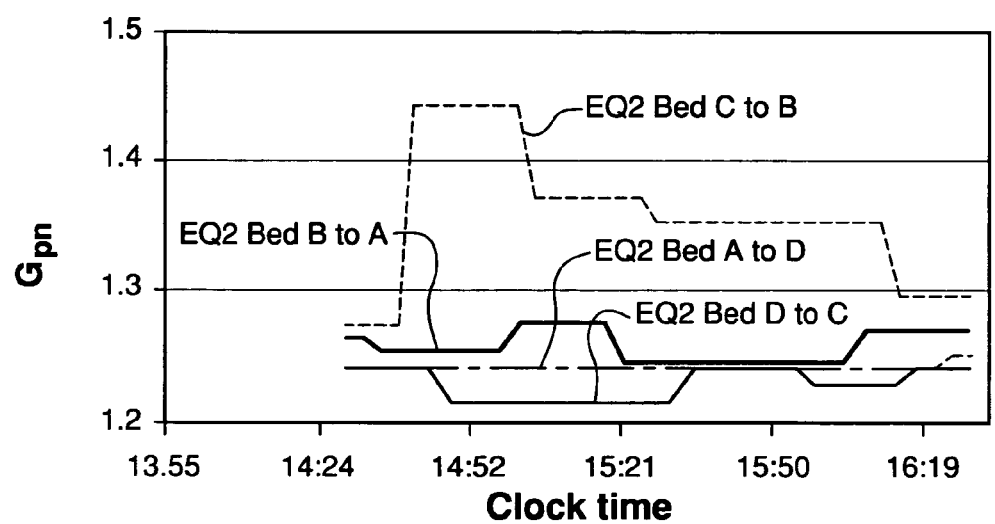
FIG. 7B is a plot of $G_{pn}$ vs. clock time for the Equalization 2 (Depressurization—Repressurization) step in a four-bed pressure swing adsorption system when valve 25 in FIG. 1 (the tailgas valve on bed B) was subjected to a deliberate leak.

Profiles of $G_{pn}$ vs. operating clock time were determined using the same PSA system and cycle of Example 3 for the Repressurization step and the Equalization 2 (Repressurization—Depressurization) step. The tailgas valve (25, FIG. 1) on bed B was caused to leak by adjusting the valve limit so that the butterfly valve no longer closed tightly against its seat between the clock times of 14:52 and 15:57 in order to observe the effects on the profiles of $G_{pn}$ vs. operating clock time. The resulting profiles are shown in FIGS. 7A and 7B.

The Repressurization check for bed B deviated in the positive direction as expected. The magnitude of the deviation can be used to quantify the leak rate. Both of the deviations for the EQ2 C→B and EQ2 B→A steps were expected to be in the positive direction. EQ2 B→A showed deviations, but they were not sufficiently greater than a selected minimum value of 0.05 to be observed. The size pressure difference across the leaking valve was expected to be larger when bed B is on the EQ2—Depressurization step (EQ2 B→A) than when bed B is on the EQ2—Repressurization step (EQ2 C→B). However, the observed deviation was more pronounced when Bed B was on the EQ2—Repressurization step (EQ2 C→B). Therefore, this argument probably does not explain the lack of response. When bed B is on its EQ2—Depressurization step, the bed contains a relatively high loading of adsorbed impurities. The gas leaking across the tailgas valve at the bottom of this vessel is expected to sweep away impurities that are desorbed from the bottom of bed, where the adsorbent is more heavily loaded with impurities. If the gas leaking across the tailgas valve contains a greater concentration of impurities than the gas supplied from the top of this bed to a bed on the EQ2—Repressurization step, this may have little effect on the bed pressure and the amount of gas provided by the bed on its EQ2—Depressurization step to the bed on its EQ2—Repressurization step as characterized by the measured change in bed pressure.

EXAMPLE 6

Figure 8A:
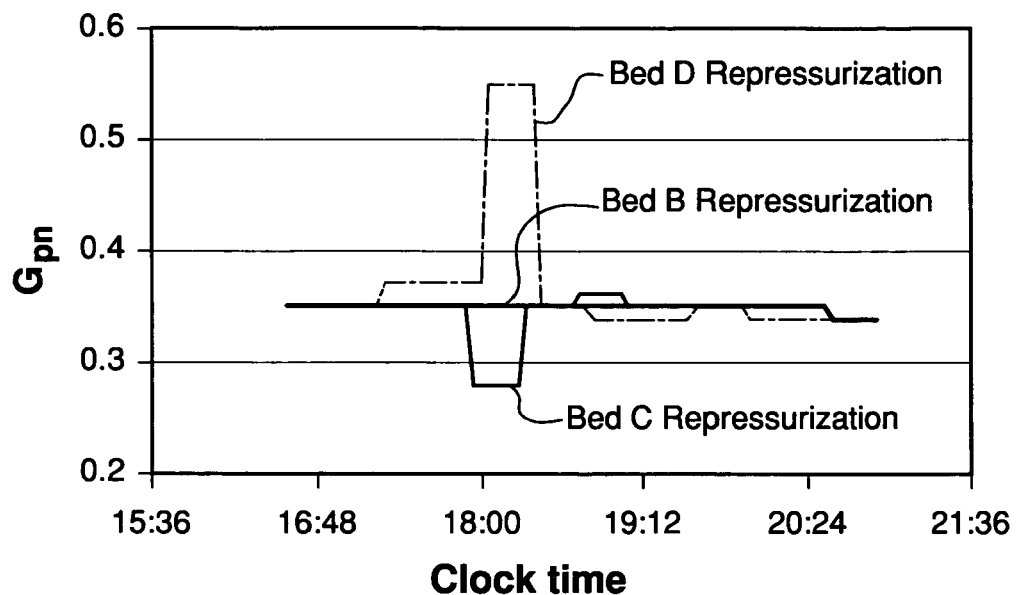
FIG. 8A is a plot of $G_{pn}$ vs. clock time for the Repressurization step in a four-bed pressure swing adsorption system when valve 23 in FIG. 1 (the EQ1 valve on bed B) was subjected to a deliberate leak.
Figure 8B:
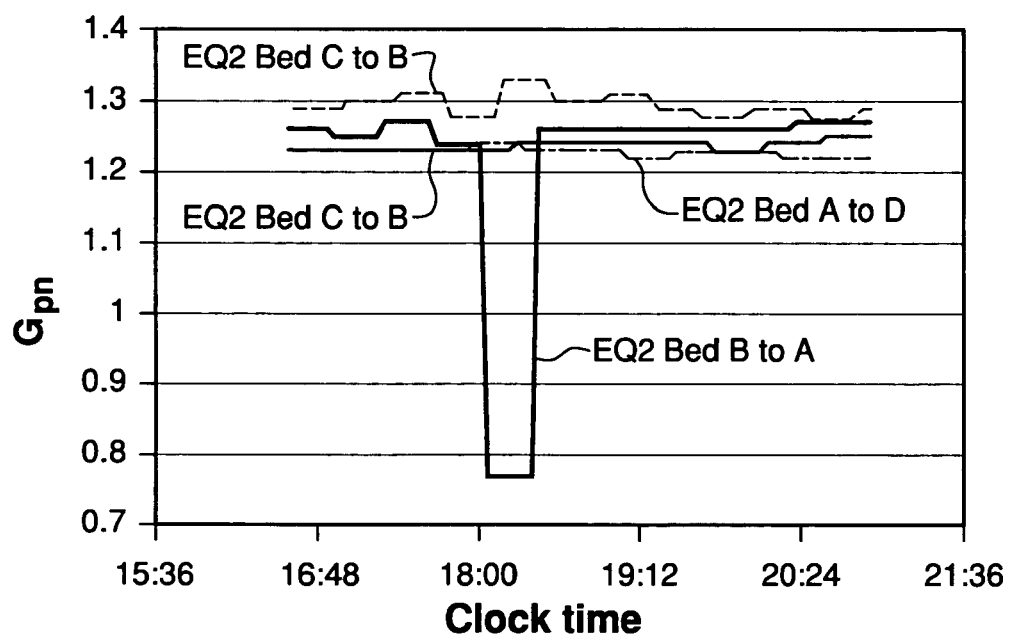
FIG. 8B is a plot of $G_{pn}$ vs. clock time for the Equalization 2 (Depressurization—Repressurization) step in a four-bed pressure swing adsorption system when valve 23 in FIG. 1 (the EQ1 valve on bed B) was subjected to a deliberate leak.

Profiles of $G_{pn}$ vs. operating clock time were determined using the same PSA system and cycle of Example 3 for the Repressurization step and the Equalization 2 (Repressurization—Depressurization) step. The EQ1 valve (23, FIG. 1) on bed B was caused to leak by adjusting the valve limit stop between the clock times of about 17:50 and 18:30 in order to observe the effects on the profiles of $G_{pn}$ vs. operating clock time. The resulting profiles are shown in FIGS. 8A and 8B. The Repressurization checks for beds C and D deviated as expected. It is believed that bed A did not undergo a Repressurization step while the valve was leaking. Sufficient time was not allowed to see the impact of the leak on the A bed Repressurization step, which was expected to deviate high.

Both the EQ2 C→B and EQ2 B→A steps were expected to show a deviation in the negative direction. The EQ2 B→A step did show a significant negative deviation, as expected, but the EQ2 C→B step did not. The size of the pressure difference acting across the leaking EQ1 valve was estimated to be significantly larger for the EQ2 B→A step (~111 psi) than for the EQ2 C→B step (~40 psi). As a result, the leakage rate during the EQ2 C→B step may be expected to be larger than that during the EQ2 B→A step. This may explain the reason for the lack of response during the EQ2 C→B step.

EXAMPLE 7

Figure 9A:
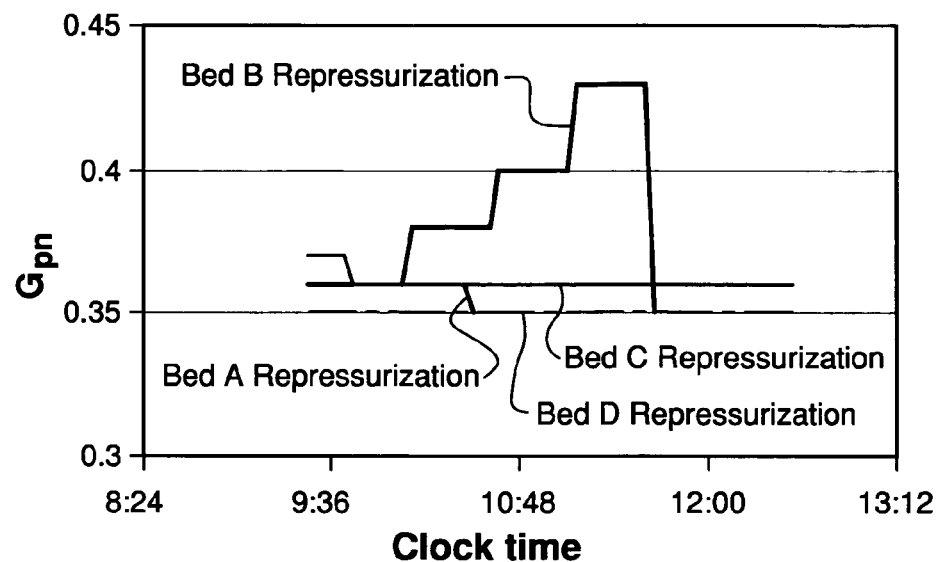
FIG. 9A is a plot of $G_{pn}$ vs. clock time for the Repressurization step in a four-bed pressure swing adsorption system when valve 24 in FIG. 1 (the EQ2—provide purge valve on bed B) was subjected to a deliberate leak.
Figure 9B:
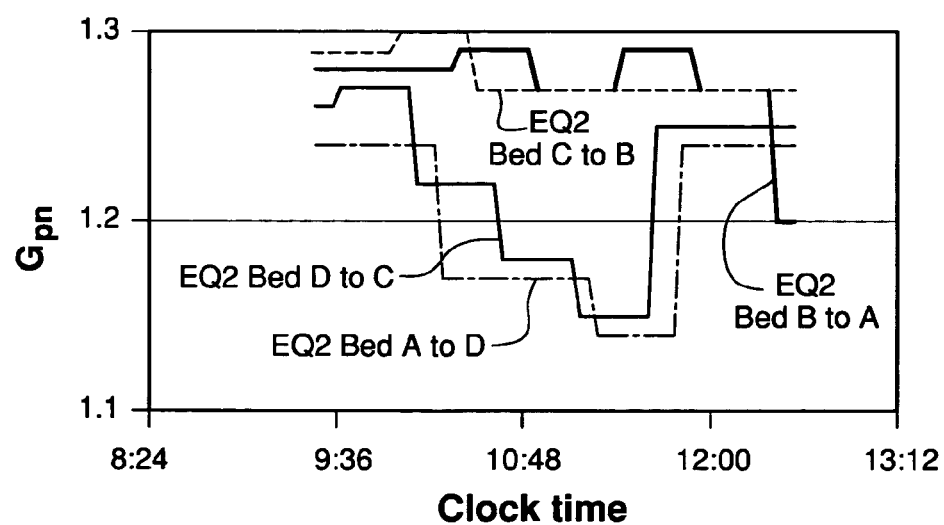
FIG. 9B is a plot of $G_{pn}$ vs. clock time for the Equalization 2 (Depressurization—Repressurization) step in a four-bed pressure swing adsorption system when valve 24 in FIG. 1 (the EQ2—provide purge valve) on bed B was subjected to a deliberate leak.

Profiles of $G_{pn}$ vs. operating clock time were determined using the same PSA system and cycle of Example 3 for the Repressurization step and the Equalization 2 (Repressurization—Depressurization) step. The EQ2—provide purge valve (24, FIG. 1) on bed B was caused to leak by adjusting the valve positioner between the clock times of about 10:15 and 11:30 in order to observe the effects on the profiles of $G_{pn}$ vs. operating clock time. The resulting profiles are shown in FIGS. 9A and 9B.

The valve positioner on valve 24 was commanded to return "closed" to positions of 5, 7, 9 and 11% open, thereby increasing stepwise the open area for a leak. The Repressurization checks for bed B deviated in the positive direction as expected. Both the EQ2 D→C and EQ2 A→D steps were expected to deviate in the negative direction, and were observed to deviate in this expected direction. The magnitude of the deviation of both the Repressurization and EQ2—Repressurization checks directly corresponded to the changes that were made to the valve opening. When the valve was commanded to remain further open, there was a corresponding response in the values of for the Repressurization and EQ2—Repressurization checks. The magnitude of the pressure difference acting across the leaking valve 24 was estimated to be large (>300 psi) during the periods when the corresponding checks were made. This means that there was a significant driving force for a leak when the leak checks identified that a leak was occurring.

EXAMPLE 8

Figure 10A:
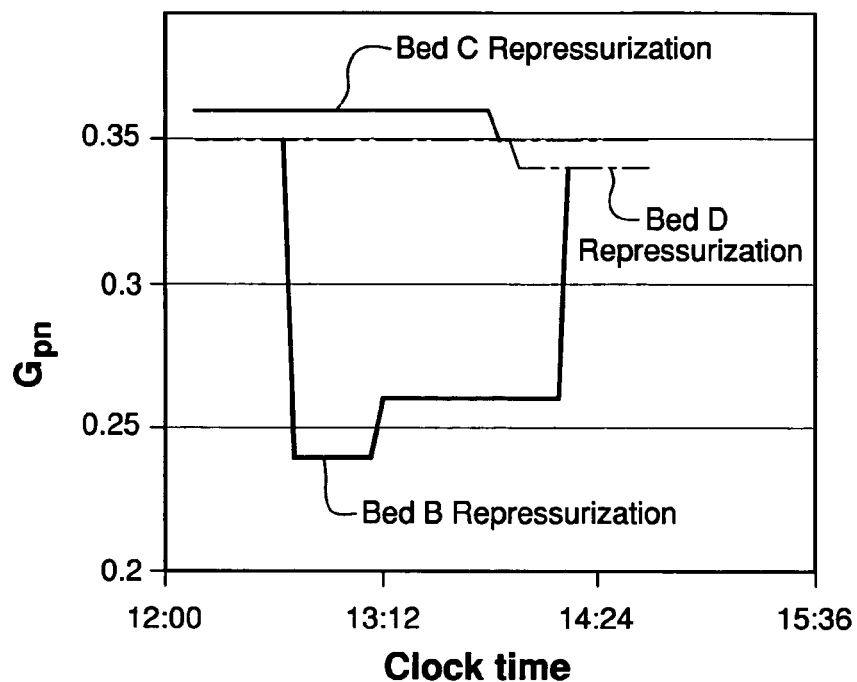
FIG. 10A is a plot of $G_{pn}$ vs. clock time for the Repressurization step in a four-bed pressure swing adsorption system when valve 21 in FIG. 1 (the feed valve on bed B) was subjected to a deliberate leak.
Figure 10B:
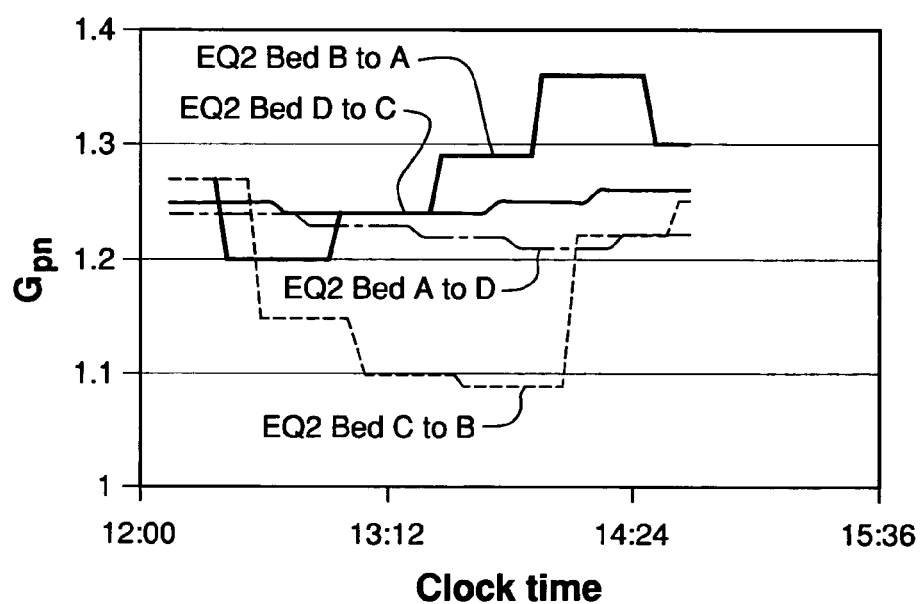
FIG. 10B is a plot of $G_{pn}$ vs. clock time for the Equalization 2 (Depressurization—Repressurization) step in a four-bed pressure swing adsorption system when valve 21 in FIG. 1 (the feed valve on bed B) was subjected to a deliberate leak.

Profiles of $G_{pn}$ vs. operating clock time were determined using the same PSA system and cycle of Example 3 for the Repressurization step and the Equalization 2 (Repressurization—Depressurization) step. The feed valve (21, FIG. 1) on bed B was caused to leak by adjusting the valve limit stop at a clock time of about 12:20. At about 12:50, an adjustment was made to reduce the leak rate, and at about 12:45 the leak was stopped. The resulting profiles are shown in FIGS. 10A and 10B.

The Repressurization checks for bed B deviated in the negative direction as expected. Both the EQ2 B→A and EQ2 C→B steps were expected to deviate in the negative direction. The EQ2 B→A step initially deviated in the negative direction, but later trended in the positive direction. When bed B is on the EQ2—Depressurization step, there is a relatively significant amount of adsorbed impurities on this bed. It is possible that the amount of adsorbed impurities will change as a consequence of the added impurities that are introduced as the feed valve continues to leak over time. As a result, the loading of impurities on bed B may have changed enough to cause the amount of gas transferred from the B bed corresponding to a given change in the pressure of Bed B to change. If $G_p$ were obtained from a direct measurement of the flow transferred from Bed B to bed A, this would to yield the expected low deviation for $G_{pn}$. The accuracy of the pressure decrease in bed B as the measure of $G_p$ therefore is questionable. The observations for the EQ2 C→B step followed expectations.

The overall results of the above Examples 3 to 7 confirm that, for this particular cycle, the Repressurization step is the most useful step in which to obtain characteristic profiles of $G_{pn}$ vs. operating clock time for identifying valve leaks. The directions and duration of the observed deviations were generally as anticipated. The Equalization 2—(Repressurization—Depressurization) step, however, appears to be less useful for this purpose because the observed deviations often were different than anticipated. It is possible that these profiles may be adversely affected by changes in the initial bed pressures and dynamic adsorption effects in the adsorber vessels.

The invention claimed is:

1. A method of operating a pressure swing adsorption system comprising
    (a) providing a pressure swing adsorption system having a plurality of parallel adsorber vessels and a plurality of valves and gas manifolds adapted to introduce gas into each adsorber vessel and withdraw gas from each adsorber vessel in a cyclic series of sequential process steps including at least a feed step, a depressurization step, a regeneration step, and a repressurization step;
    (b) operating each of the adsorber vessels in the cyclic series of sequential process steps including at least the feed step, the depressurization step, the regeneration step, and the repressurization step, wherein each of the plurality of valves is opened and closed at least once during the cyclic series of sequential process steps in a predetermined valve operating sequence;
    (c) determining a value of an operating parameter that is a function of the mass of gas provided to a receiving adsorber vessel or withdrawn from an adsorber vessel during a selected process step, portion of a process step, or series of process steps;
    (d) determining the deviation of the value of the operating parameter from a predetermined reference value; and
    (e) using the magnitude and direction of the deviation of (d) to determine whether any valves are leaking, wherein (1) when the absolute value of the deviation of (d) is less than a predetermined minimum value, no valve is identified as leaking and (2) when the absolute value of the deviation of (d) is greater than the predetermined minimum value, at least one valve is identified as leaking.

2. The method of claim 1 wherein the operating parameter is a gas transfer parameter, $G_p$, defined by the equation $$G_p = f(m_t)$$

where $m_t$ is the mass of gas provided during a time period t to the receiving adsorber vessel during the selected process step, portion of a process step, or series of process steps.

3. The method of claim 2 wherein $G_p$ is equal to the actual mass of gas provided during the time period t to the receiving adsorber vessel during a selected process step, portion of a process step, or series of process steps.

4. The method of claim 2 wherein $G_p$ is equal to the volume of gas provided to the receiving adsorber vessel during the process step, portion of a process step, or series of process steps during the time period t and wherein the volume of gas is defined at any standard temperature and pressure.

5. The method of claim 2 wherein $G_p$ is equal to the decrease in pressure of an adsorber vessel during the time period t that is providing gas to a receiving adsorber vessel during the process step, portion of a process step, or series of process steps.

6. The method of claim 1 wherein the operating parameter is defined as a pressure-normalized gas transfer parameter, $G_{pn}$, by the equation $$G_{pn}=G_p/\Delta P_R$$

where $\Delta P_R$ is the pressure increase in an adsorber vessel receiving gas during the process step, portion of a process step, or series of process steps during time period t and $G_p$ is defined as $$G_p=f(m_t)$$

where $m_t$ is the mass of gas provided to the receiving adsorber vessel during the process step, portion of a process step, or series of process steps during time period t.

7. The method of claim 6 wherein $G_p$ is equal to the actual mass of gas provided during time period t to the receiving adsorber vessel during the process step, portion of a process step, or series of process steps.

8. The method of claim 6 wherein $G_p$ is equal to the volume of gas provided to the receiving adsorber vessel during the process step, portion of a process step, or series of process steps during time period t and wherein the volume of gas is defined at any selected temperature and pressure.

9. The method of claim 6 wherein $G_p$ is equal to the decrease in pressure of an adsorber vessel during time period t that is providing gas to a receiving adsorber vessel during the process step, portion of a process step, or series of process steps.

10. The method of claim 1 wherein the operating parameter is defined as a flow-normalized gas transfer parameter, $G_{pf}$, by the equation $$G_{pf}=G_p/G_r$$

wherein $G_p$ is defined as $$G_p=f(m_t)$$

where $m_t$ is the mass of gas provided by an adsorber vessel for transfer to a receiving vessel during the process step, portion of a process step, or series of process steps during time period t and wherein $G_r$ is defined as $$G_r=f(m_{tr})$$

where $m_{tr}$ is the mass of gas flowing into the receiving vessel during the process step, portion of a process step, or series of process steps during time period t.

11. The method of claim 1 wherein the selected process step is the repressurization step.

12. The method of claim 11 wherein the operating parameter is a pressure-normalized gas transfer parameter, $G_{pn}$, defined by the equation $$G_{pn}=G_p/\Delta P_R$$

where $\Delta P_R$ is the pressure increase in the adsorber vessel during time period t that is receiving repressurization gas during the repressurization step or portion of the repressurization step and $G_p$ is equal to the volume of gas provided during time period t to the adsorber vessel during the repressurization step or portion of the repressurization step and wherein the volume of gas is defined at a selected temperature and pressure.

13. The method of claim 1 wherein the cyclic series of sequential process steps includes an equalization step in which an adsorber vessel is depressurized by withdrawing a depressurization gas therefrom and introducing the depressurization gas into a receiving adsorber vessel that is increasing in pressure.

14. The method of claim 13 wherein the operating parameter is defined as a pressure-normalized gas transfer parameter, $G_p$, by the equation $$G_{pn}=G_p/\Delta P$$

where $G_p$ is the pressure decrease during time period t in the adsorber vessel providing gas during the equalization step or portion of the equalization step and $\Delta P$ is the pressure increase during time period t in the receiving adsorber vessel receiving gas during the equalization step or portion of the equalization step.

15. The method of claim 1 wherein the selected process step is a blowdown step or a purge step.

16. The method of claim 15 wherein the operating parameter is a gas transfer parameter, $G_p$, defined by the equation $$G_p=f(m_t)$$

where $m_t$ is a mass of gas discharged from an adsorber vessel during the blowdown step or the purge step.

17. A method of operating a pressure swing adsorption system comprising
(a) providing a pressure swing adsorption system having a plurality of parallel adsorber vessels and a plurality of valves and gas manifolds adapted to introduce gas into each adsorber vessel and withdraw gas from each adsorber vessel in a cyclic series of sequential process steps including at least a feed step, a depressurization step, a regeneration step, and a repressurization step;
(b) providing a feed gas comprising hydrogen and one or more impurity components;
(c) operating each of the adsorber vessels in the cyclic series of sequential process steps including at least the feed step, the depressurization step, the regeneration step, and the repressurization step, wherein each of the plurality of valves is opened and closed at least once during the cyclic series of sequential process steps in a predetermined valve operating sequence, wherein the feed gas is passed through an adsorber vessel during the feed step to adsorb at least a portion of the one or more impurity components, and wherein a purified hydrogen product gas is withdrawn from the adsorber vessel during the feed step;
(d) determining a value of an operating parameter that is a function of the mass of gas provided to an adsorber vessel during a selected process step, portion of a process step, or series of process steps;
(e) determining the deviation of the value of the operating parameter from a predetermined reference value; and
(f) using the magnitude and direction of the deviation of (e) to determine whether any valves are leaking, wherein (1) when the absolute value of the deviation of (e) is less than a predetermined minimum value, no valve is identified as leaking and (2) when the absolute value of the deviation of (d) is greater than the predetermined minimum value, at least one valve is identified as leaking.

18. The method of claim 17 wherein the selected process step is the repressurization step and the repressurization gas is a portion of the purified hydrogen product gas.

19. The method of claim 18 wherein the operating parameter is a pressure-normalized gas transfer parameters $G_{pn}$, defined by the equation $$G_{pn}=G_p/\Delta P$$

where $\Delta P$ is the pressure increase in the adsorber vessel receiving the purified hydrogen product gas during the repressurization step or portion of the repressurization step during time period t and $G_p$ is equal to the volume of purified hydrogen product gas provided to the adsorber vessel during the repressurization step or portion of the repressurization step during time period t and wherein the volume of gas is defined at a selected temperature and pressure.

20. The method of claim 17 wherein the cyclic series of sequential process steps includes an equalization step in which an adsorber vessel is depressurized by withdrawing a depressurization gas therefrom and introducing the depressurization gas into another adsorber vessel that is at a lower pressure than adsorber vessel being depressurized.

21. The method of claim 17 wherein the cyclic series of sequential process steps includes an equalization step in which an adsorber vessel is depressurized immediately after its feed step by withdrawing a depressurization gas therefrom and introducing the depressurization gas into another adsorber vessel immediately preceding its repressurization step.

* * * * *

UNITED STATES PATENT AND TRADEMARK OFFICE
CERTIFICATE OF CORRECTION

PATENT NO. : 7,491,260 B2
APPLICATION NO. : 11/159530
DATED : February 17, 2009
INVENTOR(S) : Blaine Edward Herb et al.

It is certified that error appears in the above-identified patent and that said Letters Patent is hereby corrected as shown below:

Column 26, Line 3

In claim 14 insert -- $_n$ -- after the subscript $_p$

Column 26, Line 60

In claim 19 delete "s" off of the word parameter

Signed and Sealed this

Thirty-first Day of March, 2009

JOHN DOLL
*Acting Director of the United States Patent and Trademark Office*